United States Patent
Park

(10) Patent No.: US 11,590,403 B2
(45) Date of Patent: Feb. 28, 2023

(54) GOLF GPS DEVICE WITH HOLE RECOGNITION AND HOLE SELECTION

(71) Applicant: GolfzonDeca Inc., Seongnam-si (KR)

(72) Inventor: Jun Ha Park, Yongin-si (KR)

(73) Assignee: GOLFZONDECA INC., Seongnam-si (KR)

( * ) Notice: Subject to any disclaimer, the term of this patent is extended or adjusted under 35 U.S.C. 154(b) by 0 days.

(21) Appl. No.: 17/304,934

(22) Filed: Jun. 28, 2021

(65) Prior Publication Data

US 2022/0161119 A1    May 26, 2022

Related U.S. Application Data

(63) Continuation of application No. 16/381,766, filed on Apr. 11, 2019, now Pat. No. 11,045,708, which is a
(Continued)

(51) Int. Cl.
*G01S 19/19*  (2010.01)
*A63B 71/06*  (2006.01)
*G01S 19/35*  (2010.01)

(52) U.S. Cl.
CPC .......... *A63B 71/0622* (2013.01); *G01S 19/19* (2013.01); *G01S 19/35* (2013.01);
(Continued)

(58) Field of Classification Search
CPC ...... A63B 71/0622; G01S 19/19; G01S 19/35
(Continued)

(56) References Cited

U.S. PATENT DOCUMENTS

| | | |
|---|---|---|
| 4,698,781 A | 10/1987 | Cockerell, Jr. |
| 4,703,444 A | 10/1987 | Storms, Jr. et al. |

(Continued)

FOREIGN PATENT DOCUMENTS

| | | |
|---|---|---|
| CA | 2134737 A1 | 5/1996 |
| DE | 19719620 A1 | 11/1998 |

(Continued)

OTHER PUBLICATIONS

1999 Annual Report, Beyond.com—3 pages.
(Continued)

*Primary Examiner* — Harry K Liu
(74) *Attorney, Agent, or Firm* — Knobbe, Martens, Olson & Bear, LLP

(57) ABSTRACT

The disclosure herein provides a golf GPS device with a sensor mechanism to automatically switch between video and audio only modes of the device. More particularly, when a player attaches the golf GPS device to a piece of clothing or hat, the device automatically switches to audio-only mode. When the player detaches the golf GPS device, the device automatically switches to video mode, with or without audio. The golf GPS device further includes one or more processors configured to repeatedly determine in which one of the plurality of holes the device is located, to repeatedly compute a distance between the device and a feature of the determined hole, and to cause to display the hole number of the determined hole and the computed distance on the display screen.

20 Claims, 14 Drawing Sheets

Related U.S. Application Data continuation of application No. 15/191,409, filed on Jun. 23, 2016, now Pat. No. 10,369,451, which is a continuation of application No. 13/936,123, filed on Jul. 5, 2013, now Pat. No. 9,383,448.

(60) Provisional application No. 61/668,332, filed on Jul. 5, 2012.

(52) U.S. Cl.
CPC ............. *A63B 2071/0625* (2013.01); *A63B 2071/0666* (2013.01); *A63B 2071/0691* (2013.01); *A63B 2220/12* (2013.01); *A63B 2220/13* (2013.01); *A63B 2220/16* (2013.01); *A63B 2220/50* (2013.01); *A63B 2220/58* (2013.01); *A63B 2220/72* (2013.01); *A63B 2230/50* (2013.01)

(58) Field of Classification Search
USPC .......................................................... 342/407
See application file for complete search history.

(56) References Cited

U.S. PATENT DOCUMENTS

| | | |
|---|---|---|
| 5,056,791 A | 10/1991 | Poillon et al. |
| 5,095,430 A | 3/1992 | Bonito et al. |
| 5,202,829 A | 4/1993 | Geier |
| 5,245,537 A | 9/1993 | Barber |
| 5,294,110 A | 3/1994 | Jenkins et al. |
| 5,364,093 A | 11/1994 | Huston et al. |
| 5,365,451 A | 11/1994 | Wang et al. |
| 5,379,045 A | 1/1995 | Gilbert et al. |
| 5,438,518 A | 8/1995 | Bianco et al. |
| 5,469,175 A | 11/1995 | Boman |
| 5,507,485 A | 4/1996 | Fisher |
| 5,523,761 A | 6/1996 | Gildea |
| 5,528,232 A | 6/1996 | Verma et al. |
| 5,528,518 A | 6/1996 | Bradshaw et al. |
| 5,558,333 A | 9/1996 | Kelson et al. |
| 5,610,586 A | 3/1997 | Zeytoonjian et al. |
| 5,685,786 A | 11/1997 | Dudley |
| 5,689,269 A | 11/1997 | Norris |
| 5,699,244 A | 12/1997 | Clark, Jr. et al. |
| 5,760,742 A | 6/1998 | Branch et al. |
| 5,767,804 A | 6/1998 | Murphy |
| 5,781,505 A | 7/1998 | Rowland |
| 5,784,059 A | 7/1998 | Morimoto et al. |
| 5,787,383 A | 7/1998 | Moroto et al. |
| 5,808,565 A | 9/1998 | Matta et al. |
| 5,810,680 A | 9/1998 | Lobb et al. |
| 5,821,900 A | 10/1998 | Kishimoto |
| 5,862,511 A | 1/1999 | Croyle et al. |
| 5,884,217 A | 3/1999 | Koyanagi |
| 5,887,269 A | 3/1999 | Brunts et al. |
| 5,902,347 A | 5/1999 | Backman et al. |
| 5,904,726 A | 5/1999 | Vock et al. |
| 5,912,644 A | 6/1999 | Wang |
| 5,920,900 A | 7/1999 | Poole et al. |
| 5,943,018 A | 8/1999 | Miller |
| 5,944,768 A | 8/1999 | Ito et al. |
| 5,950,008 A | 9/1999 | Van Hoff |
| RE36,346 E | 10/1999 | Germain |
| 5,937,193 A | 10/1999 | Evoy |
| 5,966,135 A | 10/1999 | Roy et al. |
| 5,966,702 A | 10/1999 | Fresko et al. |
| 6,024,655 A | 2/2000 | Coffee |
| 6,032,108 A | 2/2000 | Seiple et al. |
| 6,049,303 A | 4/2000 | Biacs et al. |
| 6,062,991 A | 5/2000 | Moriarty et al. |
| 6,067,039 A | 5/2000 | Pyner et al. |
| 6,076,141 A | 6/2000 | Tremblay et al. |
| 6,081,665 A | 6/2000 | Nilsen et al. |
| 6,083,353 A | 7/2000 | Alexander, Jr. |
| 6,084,542 A | 7/2000 | Wright et al. |
| 6,091,358 A | 7/2000 | Maniscalco et al. |
| 6,098,089 A | 8/2000 | O'Connor |
| 6,112,025 A | 8/2000 | Mulchandani et al. |
| 6,133,853 A | 10/2000 | Obradovich et al. |
| 6,148,391 A | 11/2000 | Petrick |
| 6,151,551 A | 11/2000 | Geier et al. |
| 6,151,618 A | 11/2000 | Wahbe et al. |
| 6,154,152 A | 11/2000 | Ito |
| 6,160,509 A | 12/2000 | Graziani et al. |
| 6,163,880 A | 12/2000 | Ramalingam et al. |
| 6,169,516 B1 | 1/2001 | Watanabe et al. |
| 6,175,806 B1 | 1/2001 | Thuente |
| 6,186,908 B1 | 2/2001 | Kawasaki et al. |
| 6,204,807 B1 | 3/2001 | Odagiri et al. |
| 6,223,346 B1 | 4/2001 | Tock |
| 6,224,387 B1 | 5/2001 | Jones |
| 6,236,360 B1 | 5/2001 | Rudow et al. |
| 6,236,938 B1 | 5/2001 | Atkinson et al. |
| 6,236,940 B1 | 5/2001 | Rudow et al. |
| 6,240,361 B1 | 5/2001 | Ise et al. |
| 6,266,017 B1 | 7/2001 | Aldous |
| 6,278,402 B1 | 8/2001 | Pippin |
| 6,282,362 B1 | 8/2001 | Murphy et al. |
| 6,304,211 B1 | 10/2001 | Boman |
| 6,308,317 B1 | 10/2001 | Wilkinson et al. |
| 6,320,549 B1 | 11/2001 | Nybeck et al. |
| 6,321,091 B1 | 11/2001 | Holland |
| 6,321,158 B1 | 11/2001 | DeLorme et al. |
| 6,324,473 B1 | 11/2001 | Eschenback |
| 6,324,592 B1 | 11/2001 | Hindman |
| 6,330,419 B1 | 12/2001 | Burrell |
| 6,348,007 B2 | 2/2002 | Kawasaki et al. |
| 6,366,856 B1 | 4/2002 | Johnson |
| 6,374,286 B1 | 4/2002 | Gee et al. |
| 6,412,108 B1 | 6/2002 | Blandy et al. |
| 6,456,938 B1 | 9/2002 | Barnard |
| 6,513,156 B2 | 1/2003 | Bak et al. |
| 6,516,359 B1 | 2/2003 | Kurihara et al. |
| 6,530,080 B2 | 3/2003 | Fresko et al. |
| 6,532,531 B1 | 3/2003 | O'Connor et al. |
| 6,571,052 B1 | 5/2003 | Wakimoto et al. |
| 6,650,305 B1 | 11/2003 | Havey et al. |
| 6,658,492 B1 | 12/2003 | Kawahara et al. |
| 6,687,614 B2 | 2/2004 | Ihara et al. |
| 6,705,942 B1 | 3/2004 | Crook et al. |
| 6,748,323 B2 | 6/2004 | Lokshin et al. |
| 6,792,612 B1 | 9/2004 | Baentsch et al. |
| 6,795,770 B1 | 9/2004 | Hanshew et al. |
| 6,880,155 B2 | 4/2005 | Schwabe et al. |
| 6,952,661 B2 | 10/2005 | Agrawala et al. |
| 6,961,843 B2 | 11/2005 | O'Connor et al. |
| 7,121,962 B2 | 10/2006 | Reeves |
| 7,159,213 B2 | 1/2007 | Tock |
| 7,200,807 B2 | 4/2007 | Wu et al. |
| 7,764,231 B1 | 7/2010 | Karr et al. |
| 7,774,770 B2 | 8/2010 | Harscoet |
| 8,202,148 B2 | 6/2012 | Young |
| 2001/0014597 A1 | 8/2001 | Takiguchi et al. |
| 2001/0045904 A1 | 11/2001 | Silzer, Jr. |
| 2002/0016210 A1 | 2/2002 | Helber |
| 2002/0044086 A1 | 4/2002 | Boman |
| 2002/0052750 A1 | 5/2002 | Hirooka |
| 2002/0082122 A1 | 6/2002 | Pippin et al. |
| 2002/0082776 A1 | 6/2002 | Castiel |
| 2002/0186150 A1 | 12/2002 | Sweetapple |
| 2002/0198657 A1 | 12/2002 | Robbins |
| 2003/0135327 A1 | 7/2003 | Levine et al. |
| 2003/0191562 A1 | 10/2003 | Robertson et al. |
| 2004/0058732 A1 | 3/2004 | Piccionelli |
| 2005/0012660 A1 | 1/2005 | Nielsen et al. |
| 2005/0227791 A1 | 10/2005 | McCreary et al. |
| 2007/0277021 A1 | 11/2007 | O'Connor et al. |
| 2008/0058125 A1 | 3/2008 | Nguyen |
| 2008/0108456 A1 | 5/2008 | Bonito et al. |
| 2008/0115117 A1 | 5/2008 | Wilkinson et al. |
| 2009/0111602 A1 | 4/2009 | Savarese et al. |
| 2010/0160089 A1 | 6/2010 | Lin et al. |
| 2010/0179005 A1 | 7/2010 | Meadows et al. |

(56) References Cited

U.S. PATENT DOCUMENTS

| | | | |
|---|---|---|---|
| 2012/0071277 A1* | 3/2012 | Denton | A63B 69/36 473/407 |
| 2013/0144778 A1 | 6/2013 | Jo | |
| 2014/0009335 A1 | 1/2014 | Park | |
| 2014/0191902 A1 | 7/2014 | Kim | |

FOREIGN PATENT DOCUMENTS

| | | | |
|---|---|---|---|
| EP | 0969361 A1 | | 1/2000 |
| JP | H6-75541 U | | 10/1994 |
| JP | H8-97927 A | | 4/1996 |
| JP | H9-276458 A | | 10/1997 |
| JP | H10-113415 A | | 5/1998 |
| JP | 2005304871 A | * | 11/2005 |
| WO | WO 93/12439 A1 | | 6/1993 |
| WO | WO 95/21386 A1 | | 8/1995 |
| WO | WO 98/10246 A1 | | 3/1998 |
| WO | WO-2021145630 A1 | * | 7/2021 |

OTHER PUBLICATIONS

2002 Official PGA Tour Event Ticket—1 page.
41539-002 Simpkins/Schmidt/Bryant IntelliGolf Copyright Matters—3 pages.
A Brief History, Proshotgolf.com—3 pages (Oct. 12, 2002).
A Hit, Two-Year-Old iPAQ Pocket PC Reaches Two Million Mark, PR Newswire—8 pages (Apr. 22, 2002).
About US, On-Pin, <http://on-pin.com/about-usS/>—2 pages (Jun. 6, 2018).
About US, ProLink, <https://web.arcihive.org/web/20001211215800/http://www.goprolink.com:80/aboutus.htm>—1 page (Dec. 11, 2000).
About Us: Our Story, iwingolf.com—2 pages (Jun. 4, 2002).
Accolades, ParView—3 pages (Aug. 10, 2002).
Accolades, ParView—3 pages (Aug. 19, 2000).
Accolades, ParView—3 pages (Feb. 7, 2001).
Advertising Benefits, ParView—2 pages (Jun. 6, 2000).
Affiliate Courses, ParView—2 pages (Aug. 19, 2000).
Affinity Publishing's Software and Resource Guide: For the Palm Computing Platform, vol. 8—2 pages.
Affinity Publishing's Software and Resource Guide: For the Palm Computing Platform, vol. 7—2 pages.
Affinity Publishing's Software and Resource Guide: For the Palm Computing Platform, vol. 5—2 pages.
Affinity Publishing's Software and Resource Guide: For the Palm Computing Platform, vol. 4—2 pages.
Affinity Publishing's Software and Resource Guide: For the Palm Computing Platform, vol. 3—2 pages.
All work and No. play makes Jack a dull boy, RadioShack—2 pages.
All-purpose sites: One-stop surfing for news and more, Golf Digest—2 pages (Jun. 2000).
Allstar P/N 220-600944-0XX—User's Manual, Bae Systems Canada—164 pages (Apr. 17, 2000).
American Golf Names ProShot Golf Inc. as Exclusive Provided of GPS Services, Press Releases/Newsletters, ProShot Golf—2 pages (Apr. 26, 2000).
Another Handmark Acquisition Brings New Releases of Palm Platform Favorites, Handmark News and Press—2 pages (2001).
Approachshot1.1, Uplink Golf, <https://web.archive.org/web/20021026132733/http://uplinkgolf.com:80/demo/button/approachshot1.1.htm>—1 page (Oct. 26, 2002).
Auman, A home for golf course architects, St. Petersburg Times—2 pages (Jun. 15, 2001).
Awards and Reviews, IntelliGolf, <http://www.intelligolf.com/reviews/html>—6 pages (Apr. 15, 2002).
Barclay, Microsoft TerraServer: A Spatial Data Warehouse, ACM 2000—16 pages (Jun. 1, 1999).
Barrows, Video games scoring big as training devices, The Sacramento Bee—4 pages (May 29, 2001).

Best Gift for Golfers, Yahoo—2 pages (Nov. 30, 2000).
Beyond.com Powers New IntelliGolf eStore for Karrier Communication's—2 pages.
Bob Weisgerber, Sea to Sky—Golf Challenges On Canada's 99 North, Golf Today, Year 13, No. 12—4 pages (Aug. 2000).
Bonita Bay: The Bonita Bay Group Introduces GPS Communication and Safety Features to Its Communities Golf Courses, ParView—3 pages (Jun. 14, 2002).
Borger et al., Initialization Problems for Java, Software-Concepts & Tools, vol. 20, No. 4—5 pages (Nov. 4, 1999).
Bruce Weir, Launder & Order, Big Picture,—2 pages (Spring 2000).
Caddy for Hire, Proshotgolf.com—1 page (Oct. 12, 2002).
California Courses, iwingolf.com—2 pages (Jun. 4, 2002).
Case No. D2009-1244 ref: Intellogy, Annex A—Annex 12—70 pages.
Chateau Whistler Golf Resort Contract Renewal Includes Upgrade to New ProShot Golf Color Graphics GPS Product, Press Releases/Newsletters, ProShot Golf—2 pages (Sep. 1, 2000).
Cheung, Shallow depth of field, The Sydney Morning Herald (Australia)—3 pages (Mar. 3, 2001).
Chrisman, Unit 45—Accuracy of Spatial Databases, <http://www.geog.ubc.ca/courses/klink/gis.notes/ncgia/u45.html> 10 pages (accessed Mar. 7, 2011).
Client Services, Parview—2 pages (Aug. 10, 2002).
Club Car, Uplink Golf, <https://web.archive.org/web/20030409155246/http://www.uplinkgolf.com:80/NEWS%20TEXT/July%20CCPR%20GA.htm—4 pages (Apr. 9, 2003).
ClubCorp Selects Parview as Exclusive GPS Company, ParView—2 pages (Dec. 21, 2001).
Clubhouse: News Bulletin, Golden Tee Golf PC! <https://web.archive.org/web/20010221192545fw_/http://www.goldentee.com:80/Products/GoldenTeePC/default.htm—1 page.
Cole Memorial 2001, Auburn, CA—1 page.
Color Caddy Spec Sheets, <https://web.archive.org/web/20010306115320/http://uplinkgolf.com:80/products/SpecSheets/ColorCaddy.html>, in 3 pages.
Common Stock, Handspring—2 pages (May 30, 2000).
COMP USA: The Computer Superstore—2 pages.
Company Info, StarCaddy, <https://web.archive.org/web/20020604013427/http://www.starcaddy.com:80/company.cfm—2 pages (Jun. 4, 2002).
Company Info, StarCaddy, <https://web.archive.org/web/20021014155409/http://www.starcaddy.com:80/company.cfm—2 pages (Oct. 14, 2002).
Company Overview, ParView—1 page (Aug. 19, 2000).
Company Profile, ParView—2 pages (Dec. 12, 2001).
Computers and Software, Desktop Greens, <http://www.desktopgreens.com/links.computersandsoftware.html>—7 pages (Apr. 26, 2002).
Contact Us, ProLink and E-Z-GO Alliance, <https://web.archive.org/web/20030207065710fw_/http://www.goprolink.com:80/nf/contact1.htm>—1 page.
Cook, Software for palm-size computer helps golfer track scores, statistics, The Associated Press State & Local Wire—2 pages (Aug. 23, 1998).
Coombe, The implication of GPS data loss on real time digital terrain modelling, The Australian Surveyor, vol. 42, No. 3—4 pages (1997).
Corey Kilgannon, Golf Hand-Helds for the Gallery, If Not the Links, The New York Times—3 pages ( Aug. 13, 2001).
Course Directory, ParView—2 pages (Jan. 27, 2001).
Course Management Benefits, ParView—2 pages (Aug. 19, 2000).
Course Management, Benefits, ParView—2 pages (Dec. 12, 2001).
Coyote Moon Golf Course Joins International Roster of Golf Courses Offering ProShot Golf's GPS System, Press Releases/Newsletters—ProShot Golf—2 pages (Oct. 5, 2000).
Daley et al., National Height Modernization Study: Report to Congress, The National Geodetic Survey—181 pages (Jun. 1998).
Devils Ridge: Parview Makes a Grand Addition to the Impishly Delightful Devil's Ridge Golf Course, Parview—2 pages (Aug. 16, 2002).
Directions to Forest Creek, Proshot.com,—1 page (Feb. 9, 1997).

(56) References Cited

OTHER PUBLICATIONS

Dorall Arrowwood: The Parview System Makes a Grand Addition to the Luxurious Doral Arrowwood Resort, Parview—3 pages (Aug. 16, 2002).
Duffers debut GPS system at upscale golf course, Ottawa Citizen <https://web.archive.org/web/20030409134339/http://www.uplinkgolf.com:80/NEWS%TEXT/OttawaCitizen.htm>—1 page (Jun. 20, 2002).
Easy to Use! Operating Instructions, Eagle Scoremaster Golf Computer—31 pages.
Emerald Bay: Prestigious Emerald Bay Golf Club Finds a Diamond in the Rough with the Parview GPS System—2 pages (Jun. 14, 2002).
Enhanced Color Graphic Caddy Demonstration, UpLink Golf, <https://web.archive.org/web/20020802170046/http://uplinkgolf.com:80/demo/button/hole/Hole_Screen1.html>—2 pages (Aug. 2, 2002).
Executive Team, iGolf Technologies, <https://web.archive.org/web/20031008123904/http://www.igolftech.com:80/exectuiveteam.htm, 1 page (Oct. 8, 2003).
Expect more, Do more, COMPAQ Aero, Powered by Microsoft Windows CE—2 pages.
'Eye in the Sky' at Colbert Hills Golf Course, Parview—2 pages (Aug. 16, 2002).
Fairways&Greens, vol. 4, No. 7—2 pages (Aug. 2001).
Fairways&Greens, vol. 4, No. 8—2 pages (Sep.-Oct. 2001).
FAQ, StarCaddy, <https://web.archive.org/web/20020809194256/http://www.starcaddy.com:80/faq.cfm>—3 pages.
Featured Software Applications, Handango—PDA Software Downloads—3 pages (Nov. 4, 2002).
Featured Software Applications, Handango—Welcome to Handango—1 page (May 17, 2002).
File History of U.S. Pat. No. 6,456,938—656 pages.
File History of U.S. Pat. No. 71,14,498—697 pages.
Forest Creek Golf Club—Main Page, Proshot.com—1 page (Feb. 9, 1997).
Fort Carson Golf Club: GPS Technology Returns to Its Roots as Fort Carson Golf Club Signs on with Parview, ParView—2 pages (Aug. 16, 2002).
Game Features, Microsoft Links 2001, <https://web.archive.org/web/20000901071046/http://microsoft.com:80/games/links2001/game_features.asp>—2 pages (Sep. 1, 2000).
GameMaster: Improve Your Game, iwingolf.com—1 page (Jun. 4, 2002).
General Information, Forest Creek Golf Club, Proshot.com—1 page (Feb. 9, 1997).
Golden Tee 2K (Screenshots)—2 pages.
Golden Tee 3D (Screenshots)—2 pages.
Golden Tee '99 Arcade Game, Incredible Technologies (Photos)—2 pages (1999).
Golden Tee Fore! 2002: The Games with the Midas Touch <https://web.archive.org/web/20010411013359fw_/http://www.goldentee.com:80/Products/GoldenTee2002/DEFAULT.htm>—1 page (2002).
Golden Tee Golf Fore preview, Golden Tee 2K, Incredible Technologies <https://web.archive.org/web/20010411013652/http://www.goldentee.com:80/Products/GoldenTee2k/DEFAULT.htm>—1 page (Apr. 11, 2001).
Golden Tee Golf PC! <https://web.archive.org/web/20010221192545fw_/http://www.glodentee.com:80/Products/GoldenTeePC/default.htm>—1 page.
Golden Tee Golf, IGN PC—3 pages <http://web.archive.org/web/19981202121117/http://pc.irgn.com/reviews/3106.html>—3 pages (May 16, 2018).
Golden Tee™ Golf for PlayStation Press Release, Products <https://web.archive.org/web/20010222153431/http://www.goldentee.com:80/Products/GoldenTeePSX/Wheretobuy.htm>—1 page (Feb. 22, 2001).
Golf Course Goes High-Tech and Installs Global Positioning System (GPS) Technology in Golf Carts, Press Room, ParView—1 page (Sep. 15, 2000).
Golf Course News: The News paper for the Golf Course Industry, vol. 9, No. 7—72 pages (Jul. 1997).

Golf Kaddie 99, Software User Manual—6 pages.
Golf Programs FORE You, Pocket PC, vol. 3, No. 3—4 pages (May/Jun. 2000).
Golf Pros, GolfPS™ Personal GPS Golf System, <https://web.archive.org/web/20020610040720/http://golfps.com:80/golfpros.htm—1 page (Jun. 10, 2002).
Golf Season is Here With IntelliGolf 4.0 for Palm-size PCs, PR Newswire—2 pages (May 5, 1999).
Golfer's Benefits, Parview—2 pages (Aug. 9, 2002).
Golfer's Benefits, Parview—2 pages (Dec. 12, 2001).
Golfer's Benefits, Parview—2 pages (Jan. 25, 2001).
Golfer's Benefits, Parview—2 pages (Oct. 8, 2003).
Golfers Go High-Tech with IntelliGolf for the Latest Version of Windows CE for the Palm-size PC, PR Newswire—2 pages (Feb. 1, 1999).
Golfer's Guide to Fingertip for Golf, Version 2.1, Fingertip Technologies Inc.—37 pages (1993).
Golfer's Perspective: Interactive Experience, ParView—1 page (Aug. 19, 2000).
Golfer's Perspective Benefits, ParView—2 pages (Aug. 19, 2000).
Golfer's View, Proshotgolf.com—1 page (Oct. 12, 2002).
GolfPS Catalogue, GolfPS™ Personal GPS Golf System, <https://web.archive.org/web/20020408100432114/http://golfps.com:80/storeframe.asp?all=1>—4 pages (Jun. 10, 2002).
GolfPS launches their Microsoft Pocket PC Personal GPS Golf System and online Community, GolfPS, <https://web.archive.org/web/20020818170705/http://www.golfps.com:80/pdf/FirstPressRelease.htm>—2 pages (Aug. 18, 2002).
GolfPS News, GolfPS™ Personal GPS Golf System, <https://web.archive.org/web/20020408100643/http://golfps.com:/80/golfnews.htm—1 page (Apr. 8, 2002).
GolfPS News, GolfPS™ Personal GPS Golf System, <https://web.archive.org/web/20021016202137/http://golfps.com:80/golfnews.htm>—1 page (Oct. 16, 2002).
GolfPS Personal GPS Golf System, GolfPS™ Personal GPS Golf System, <https://web.archive.org/web/20020526150516/http://golfps.com:80/>—2 pages (May 26, 2002).
GolfPS The Personal GPS Golf System, Global Positioning System, GolfPS™ Introducing the GolfPS™ Personal GPS Golf System, <https://web.archive.org/web/20011104020719/http://www.golfps.com:80/>—2 pages (Nov. 4, 2001).
GolfPS™ Screenshots—4 pages.
Golfsouth Announces Agreement to Install Parview's GPS Management System at Golfsouth Courses, Press Room, ParView—1 page (Sep. 15, 2000).
GolfTrac Information, FPS, LLC, <http://www.fps.com/pilot/More/GolfTrac/1X/GolfTrac.htm>—2 pages (Feb. 8, 1998).
Golftrac Pro Overview, GolfTrac—Handmark, <http://www.handmark.com/products/golftrac/index.html>—2 pages (Jun. 6, 2001).
GolfTrac Users: Upgrade to IntelliGolf Today!, IntelliGolf, <http://www.intelligolf.com/upgrade.html>—2 pages (Mar. 5, 1998(.
GolfwareGPS for Palm, <http://download.cnet.com/GolfwareGPS/3000-7460_4-10945021.html>—5 pages (Oct. 28, 2001).
GPS Companion, Magellan Corporation—96 pages (2000).
GPS Equipment, Parview—2 pages (Aug. 19, 2000).
GPS Industries, Inc.—Company Profile, Information, Business Description, History, Background Information on GPS Industries, Inc., <http://www.referenceforbusiness.com/history2/42/GPS-Industries-Inc.html>—4 pages.
GPS Sports Login, GPS Sports, <https://web.archive.org/web/20010720110433/http://gpssports.com:80/>—2 pages (Jul. 20, 2001).
GPS Sports Login, GPS Sports, <https://web.archive.org/web/20020325041703/http://gpssports.com:80/>—2 pages (Apr. 25, 2002).
GPS Technical Overview, ParView—1 page (Dec. 12, 2001).
GPS Technology Overview, Parview—2 pages (Jan. 27, 2001).
Grand Cypress Golf Resort Introduces ProShot Gold Newest Product: Proprietary Color Diffusion Graphics, Press Releases. Newsletters—2 pages (Apr. 12, 2000).
Graves, Island Data Helps Burrow Into Mountains of E-Mail: Golf Balls and Satellites Collide at Steele Canyon, San Diego Business Journal—2 pages (Oct. 21, 2002).
Greene, Computer Golf Games, Orlando Sentinel—2 pages (Jul. 1, 2001).

(56) References Cited

OTHER PUBLICATIONS

Handango and Tucows Store, Handango—1 page (May 3, 2002).
Handheld computing Buyer's Guide, Issue 1.1—2 pages (Spring 2000).
Handmark GolftracPro 4.0, PalmGear.com—Handmark GolftracPro 4.0—Product ID: 13773, <http://www. palmgear.com/sofware/showsoftware.cfm?prodID=13773>—2 pages (May 16, 2003).
Handmark GolftracPRO, GolfTrac—The Original Golf Scoring Application for Your Palm OS Device!, <http://www.handmark.com/products/golftrac/index.html>—2 pages (Aug. 6, 2001).
Handmark GolftracPRO: Read me First!, Handmark—10 pages.
Handspring: Add-on & Accessories Catalog, 27 pages.
Handspring™ Add-On & Accessories Catalog—2 pages.
Handspring™ Add-On & Accessories Catalog,—5 pages.
Hidden River Golf & Casting Club: Beauty Embraces Technology As Hidden River Welcomes the Parview GPS System, ParView—2 pages (Aug. 16, 2002).
History and Tradition Become Futuristic, ParView—2 pages (Sep. 15, 2000).
Holiday Gift Guide, Handheld computing, Issue 5.6—2 pages (Dec. 2002/Jan. 2003).
Holmstrom, Keeping Technology in Check on the Golf Course, The Christian Science Monitor <https://www.csmonitor.eom/1997/0722/072297.feat.sports.1.html>—4 pages (Jul. 22, 1997).
Home Page, ParView—2 pages (Aug. 3, 2001).
Home Page, ParView—2 pages (Aug. 5, 2002).
Home Page, ParView—2 pages (Dec. 12, 2001).
Home Page, ParView—2 pages (Feb. 7, 2003).
Home Page, ParView—2 pages (Jun. 7, 2002).
Home Page, ParView—2 pages (Oct. 12, 2002).
Home, Microsoft Links 2001, <https://web.archive.org/web/20000815084849/http:/www.microsoft.com/games/links2001>—1 page (Aug. 15, 2000).
Home, StarCaddy, <https://web.archive.org/web/20020604015647/http://www.starcaddy.com:80/index.cfm—2 pages (Jun. 4, 2002).
Home, StarCaddy, <https://web.archive.org/web/20021014171902/http://www.starcaddy.com:80/index/cfm—2 pages (Oct. 14, 2002).
Homepage, Parview—2 pages (Jun. 6, 2001).
Homepage, Parview—2 pages (Oct. 1, 2003).
Homepage, Parview—3 pages (Jan. 10, 2001).
Homepage, ParView—3 pages (May 10, 2000).
Homepage, ParView—3 pages (Nov. 28, 1999).
How GolfPS™ Works, GolfPS™ Personal GPS Golf System, <http://web.archive.org/web/20020610040702fw_/http://golfps.com:80/howgolfworkks.htm—2 pages (Jun. 10, 2002).
Hunter, Software Means No More Mr. Slice Guy, Vancouver Province (Canada)—2 pages (Aug. 27, 2000).
Idle Hour, Inc., Time Well Spent™—2 pages.
iGolf GPS <https://web.archive.org/web/20011227041122/http://www.igolfgps.com:80/>—1 page (Dec. 27, 2001).
iGolf Technologies <http://www.igolftech.com:80/>—1 page (Oct. 6, 2003).
iGolf Technologies, iGolfGPS, ZDNet—<https://downloads.zdnet.com/product/2099-30819/>, 3 pages (Apr. 25, 2002).
iGolf Technologies, SD GPS, <https://web.archive.org/web/20031003222757/http://www.igolftech.com:80/sdgps/php>,—1 page (Oct. 3, 2003).
iGolf Technologies: Free Trial <http://www.igolftech.com:80/freetrail.php>—1 page (Aug. 29, 2003).
Information Overload, Handango—Palm® Products,—2 pages (Aug. 6, 2001).
IntelliGolf—Competitive Comparison, IntelliGolf, <http://www.intelligolf.com/compare.html>—2 pages (Feb. 8, 1998).
IntelliGolf—Golf Scoring and Wagering Software,<www.intelligolf.com>—2 pages.
IntelliGolf Cartridge (Front & Back)—2 pages.
IntelliGolf for the Palm VII, PR Newswire,—2 pages (May 24, 1999).
IntelliGolf® Birdie Edition, 2 pages.
IntelliGolf® for the Handspring™ Visor™ V5.0—2 pages.
IntelliGolf® For the Visor™ Birdie Edition (Photos)—3 pages.
It's a whole in one, Advertiser (Australia)—2 pages (Jun. 23, 2001).
James Frank, Extra What's In—Buying 20/20, Golf Magazine—2 pages (Nov. 1999).
Jeanette Watson, Golf Tech: Technology has made its way into every facet of life, including your golf game, TechTV, <http://www.techtv.com/products/consumerelectronics/story/0,23008,3332203,00.html>—2 pages (Apr. 26, 2002).
John Cook, Golfing Buddies Score with Tool for the Links, San Francisco Chronicle—1 page (Aug. 31, 1998).
John Cook, Golfing goes high-tech, Eastside Journal—2 pages (Aug. 14, 1998).
Karrier Communications, MIDRANGE Systems, vol. 12, No. 8—1 page (May 24, 1999).
Keefe, Austin's Uplink inks golf GPS deal, <https://web.archive.org/web/20030409133551/http://www.uplinkgolf.com:80/NEWS%20TEXT/July3CC.htm—2 pages.
King of Clubs, Instant Cool, Stuff Magazine—3 pages.
Kirby, Problems of mapping a nature reserve: Aberlady Bay LNR and SSSI, University of Edinburgh—4 pages.
Legacy's Golfers get a little help from above, The Des Moines Register—1 page (May 28, 2002).
Liang et al., Dynamic Class Loading in the Java™ Virtual Machine, Sun Microsystems Inc.—9 pages.
License Agreement, Golf Kaddie 99 Version 1.0—2 pages (1999).
Links 2001 Version 1.1—Screenshots—14 pages.
Links Corp: The Wait is Over: Ernst & Young Names Parview's CEO as Latest EOY Winner, ParView—2 pages (Aug. 16, 2002).
Local Course Revitalizes with Help from above: Parview's GPS Technology Breathes New Life into Carrollwood Golf Club, Parview—1 page (Sep. 15, 2000).
Lorensen et al., Golf Green Visualization, General Electric Company, IEEE Computer Graphics & Applications—10 pages (Jul. 1992).
Lorensen et al., Golf Green Visualization, General Electric Company, Corporate Research & Development—9 pages(1991).
Macintosh, Windows, and Newton GPS Programs (aka, my competition), GPSy: Macintosh GPS Communications—<http://gpsy.com:80/gpsinfo/software.html> 2 pages (May 3, 1998).
Magellan GPS Companion (Back & Front), Photos—2 pages.
Magellan NAV 6000 User Manual, Magellan Systems Corporation—110 pages (1998).
Manager's View, Proshotgolf.com—2 pages (Oct. 12, 2002).
Map Your Course, GolfPS™ Personal GPS Golf System, <https://web.archive.org/web/20020610041401fw_/http://golfps.com:80/mapyourcourse.htm>—1 page (Jun. 10, 2002).
Marketplace, Handheld & Pocket PC Buyer's Guide, Pocket PC Magazine - 2 pages (2002).
Marketplace, Handheld computing Buyer's Guide—2 pages (2002).
Marketplace, Pocket PC Magazine, vol. 5, No. 5—2 pages (Nov. 2002).
Marketplace, Pocket PC, vol. 5, No. 4 (Sep. 2002).
Marketplace, Pocket PC, vol. 4, No. 4—2 pages (Sep. 2001).
Martha Mendoza, Latest Palm Hand-held computer joins booming market, The Detroit News, <http://detnews.com/1999/technology/9905/26/05250215.htm>—2 pages (My 25, 1999).
McLean, Breaking 100-90-80: A monthly guide to the scoring basics, Golf Digest, vol. 51, No. 2—3 pages (Feb. 2000).
Menu Screen, UpLink Golf, <https://web.archive.org/web/20020817070600/http://uplinkgolf.com:80/demo/button/menu/menu_screen1.html—2 pages.
Microsoft and Celebrity Caddie Joe Montana Celebrate Launch of the 'Links 2001' PC Golf Games with $100,000 Prize to Greatest PC Golfer, PR Newswire—4 pages (Nov. 9, 2000).
Microsoft and Golf Digest Challenge Contestants to Design Next Golf Course Masterpiece, PR Newswire—3 pages (May 14, 2001).
Microsoft Game for Holidays Software giant's interactive offerings hit stores in October, New York Daily News—2 pages (Sep. 12, 2000).
Microsoft Links 2001 Inks Deal with Annika Sorenstam, The Lpga's Top Player in 2000, PR Newswire—3 pages (Jul. 27, 2000).
Microsoft Pocket PC 2002 and IntelliGolf, Microsoft, <http://www.intelligolf.com/dixon.asp>—1 page (Apr. 15, 2002).

(56) References Cited

OTHER PUBLICATIONS

Microsoft Windows CE Resource Guide for PC Companions, vol. 7—2 pages.
Microsoft Windows CE Resource Guide for PC Companions, vol. 8—2 pages.
Miller et al., Break 90 every time: The middle-handicapper's complete guide to scoring, Golf Digest, vol. 51, No. 3—6 pages (Mar. 2000).
Miller, Golfers Getting Help from Above, Los Angeles Times <http://articles.latimes.com/print/1996-03-25/business/fi-51159_1_golfers-information—1 page (Mar. 25, 1996).
Misra et al. Global Positioning System: Signals, Measurements, and Performance, Ganga-Jamuna Press, 2nd Edition—35 pages.
Murphy et al., GPS Aided Retrotraverse for Unmanned Ground Vehicles, SPIE 10th Annual AeroSense Symposium Conference 2738, Navigation and Control Technologies for Unmanned Systems—10 pages (Apr. 1996).
New Golf Tool Offers Unparalleled Services, In The News, iwingolf.com—2 pages (Jun. 1, 2002).
News, iwingolf.com <https://web.archive.org/web/20001204200600/http://www.iwingolf.com:80/>—2 pages (Dec. 4, 2000).
Noriyuki, Just Think of It as a Big Eye in the Sky . . . Watching, LA Times <http://articles.latimes.com/1997-04-27/news/ls-52865_1_big-brother/2>—3 pages (Apr. 27, 1997).
Nothing Comes Free, Proshot Golf—2 pages (Sep. 25-28, 2002).
Oak Harbour Golf Club: Parview's GPS Technology Docks at Oak Harbor Golf Course, ParView—2 pages (Aug. 16, 2002).
Ohio Golf Facility Goes Global!: Course Uses Global Positioning System to Assist Golfers, ParView—2 pages (Sep. 15, 2000).
Ohnishi et al., Map Database Generation System for In-Vehicle Navigation System, Vehicle Navigation & Information Systems Conference Proceedings—6 pages (1994).
Opasia and IntelliGolf, Opasia, <http://www.intelligolf.com/tdc.asp—1 page (Apr. 15, 2002).
Overview, Proshot.com, <https://web.archive.org/web/20010122064800fw_/http://www.proshot.com:80/company/index.html>—4 pages.
Palm Organizers, BRAVE—3 pages (Winter 1999).
Palm Wireless, Pen Computing—2 pages (Sep. 2001).
PalmGear.com Software Search Results—4 pages (May 3, 2001).
PalmGear.com Software Search Results—9 pages (Jun. 6, 2001).
PalmPilot Compatible Software Test Result, prepared for Karrier Communications, by Product Quality Partners Inc.—25 pages (Dec. 16, 1997).
PalmPower Magazine, ZATZ: Pure Internet Publishing—2 pages (Aug. 6, 2002).
Parview Advertising: Mechanical Requirements, ParView—2 pages.
ParView Brochure—12 pages.
Parview Inc.: ClubCorp Selects Parview As Exclusive GPS Company, Press Room, Parview—6 pages (Aug. 10, 2002).
ParView Inc.: Infortech Wireless Technology Inc. Signs Memorandum of Understanding to Merge with Parview Inc., ParView—3 pages (Aug. 8, 2001).
Parview Premiers in New Mexico when Santa Ana Brings GPS Technology to their Golf Course, Parview—2 pages (Sep. 15, 2000).
ParView scores with GPS for golf carts, Tampa Bay Business Journal, <http://www.bizjournals.eom/tampabay/stories/1998/11/23/daily10.html—3 pages (Nov. 27, 1998).
Parview System Features, ParView—2 pages (Jan. 27, 2001).
ParView, Brochure—1 page (Aug. 10, 2002).
ParView, Brochure—1 page (Feb. 21, 2001).
Pen Computing—2 pages (Jul. 2001).
Pen Computing—2 pages (May 2001).
Peter Jacobsen's Golden Tee Golf (Screenshots)—3 pages.
Peter Jacobsen's Golden Tee Golf™, Golden Tee Golf for PlayStation®, <https://web.archive.org/web/20010410014356/http://www.goldentee.com:80/Products/GoldenTeePSX.DEFAULT.htm—2 pages (Apr. 10, 2001).

Pleasant Valley Country Club: Tradition and Technology Walk Hand in Hand as Pleasant Valley Country Club Adds the Parview System, ParView—3 pages (Jun. 14, 2002).
Pocket PC 2002, Pen Computing—pages (Nov. 2001).
Pocket PC Featured Software, COMPAQ, <http://compaq.handango.com/>—1 page (May 6, 2002).
Pocket PC Software, Handango—Pocket PC Software—2 pages (May 6, 2002).
PocketPC Resource Guide, Microsoft Windows Powered, vol. 1—3 pages.
Premier Golf Cart Communications, ParView—1 page (Feb. 16, 1998).
President/CEO, ProLink, <https://web.archive.org/web/20000517033413/http://www.goprolink.com:80/president_ceo.htm>—1 page (May 17, 2000).
Press Releases, from Magellan Public Relations Department—3 pages.
Press Releases, StarCaddy, <http://web.archive.org/web/20101225015524/http://starcaddy.com/pr_sc_1.cfm>—2 pages (Apr. 4, 2002).
Press Releases, StarCaddy, <https://web.archive.org/web/20101225015728/http://starcaddy.com/pr_uspoen.cfm—2 pages (Jun. 18, 2002).
Press Releases, StarCaddy, <https://web.archive.org/web/20101225015524/http://starcaddy.com/pr_sc_1.cfm—2 pages (Dec. 25, 2010).
Press Releases/Newsletters, Proshot.com, <https://web.archive.org/web/20010122071400fw_/https://www.proshot.com:80/news/index.html>—1 page.
Press Room, ParView—1 page (Aug. 19, 2000).
Products, StarCaddy, <https://web.archive.org/web/20020604020905/http://www.starcaddy.com:80/products.cfm—3 pages (Jun. 4, 2002).
Products, StarCaddy, <https://web.archive.org/web/20021014194259/http://www.starcaddy.com:80/products.cfm—3 pages (Oct. 14, 2002).
Products, The Official Microsoft Games Web Site, <https://web.archive.org/web/20001115000000/http://microsoft.com:80/games/products.asp?filter=order>—12 pages (Nov. 15, 2000).
Profile, iGolf Technologies, <https://web.archive.org/web/20031008134522/http://www.igolftech.com:80/profile.htm>, 1 page (Oct. 8, 2003).
ProLink and E-Z-GO Alliance, ProLink, <http://web.archive.org/web/20030415163527fw_/http://www.goprolink.com:80/nf/ezgo.htm>—1 page.
ProLink as Featured on CNNFN, In the News, iwingolf.com—1 page (Feb. 21, 2001).
ProLink Contact Information, ProLink, <https://web.archive.org/web/20000302014800/http://www.goprolink.com:80/continfo.htm>—1 page (Mar. 2, 2000).
ProLink Debuts Golf Statistics Engine, In The News, iwingolf.com—1 page (Jun. 4, 2002).
ProLink delivers real time information, ProLink, 17 pages.
ProLink Main Page, <https://web.archive.org/web/20000301164420/http://www.goprolink.com:80/>—2 pages (Mar. 1, 2000).
ProLink Prevails in Patent Infringement Lawsuit, ProLink, <https://web.archive.org/web/20000831200935/http://www.goprolink.com:80/>—2 pages (Aug. 31, 2000).
ProLink Products Page, ProLink, <https://web.archive.org/web/20001110044200/http://www.goprolink.com:80/sysfeat.htm>—1 page (Nov. 10, 2000).
ProLink's GameMaster records, calculates and tracks your golfers' game, ProLink, <https://web.archive.org/web/20030623165157fw_/http://goprolink.com:80/nf/gamemaster1.htm>—1 page.
ProLink—The Most Feature-Rich, Reliable System in the Industry, ProLink, <https://web.archive.org/web/20021006125438fw_/http://www.goprolink.com:80/nf/profile1.htm—1 page.
ProLink—Where Technology and Tradition Meet, Prolink, <https://web.archive.org/web/20021006101753fw_/http://www.goprolink.com:80/nf/prolinksys1.htm—1 page.
Promicion Especial de Golf de Compaq e IntelliGolf, COMPAQ, <http://www.intelligolf.com/ipaq-ar.asp>—1 page (Apr. 15, 2002).
Proshot Golf Hires Fred Corcoran to Direct Southeast Region Sales Efforts, Press Releases/Newsletters—2 pages (Mar. 15, 2000).

(56) References Cited

OTHER PUBLICATIONS

ProShot Golf Introduces Proprietary Diffusion Technology Color Graphics, Press Releases/Newsletters—1 page (Jan. 5, 2000).
ProShot Golf New T2000 Product Launch Delivers Rave Reviews: It's What The Marketplace Has Told US it Wants, Press Releases/Newsletters, ProShot Golf—2 pages (Sep. 25, 2000).
Public Golf Forum—1 page (Oct. 1998).
Quick reference guide—15 pages.
Quote Request, ParView—2 pages (Aug. 9, 2002).
Quote Request, ParView—2 pages (Jun. 7, 2000).
RadioShack Canada, Palm and IntelliGolf Special Golf Promotion, <http://www.intelligolf.com/rsc/asp>—1 page (Apr. 15, 2002).
Reader Service, Pen Computing Magazine—2 pages (Nov. 2000).
Readme, Golf Kaddie 99—1 page.
Recent News, Yahoo! Finance-PALM, <http://quote.yahoo.com/q?s=palm&d=v1>—2 pages (Nov. 1, 2000).
Regional Sales Contacts, ParView—2 pages (Aug. 10, 2002).
Reviews, Tap Magazine, Issue 2.4—4 pages (Sep./Oct. 1999).
Revolutionary SD GPS Package for Palm OS ® and Pocket PC, San Diego, CA—1 page (Sep. 2, 2003).
Rhett Anderson, Chip, Handheld Computing, Issue 5.1—10 pages.
Rosano, 'Diamond' Continues To Improve, Hartford Courant—3 pages (Oct. 29, 2000).
Rubenstein, Having a ball with Rule 35 at golf show, 2000 WLNR 7964550, NewsRoom—3 pages(Feb. 14, 2000).
Sales & Marketing, ProLink, <https://web.archive.org/web/20000302032001/http://www.goprolink.com:80/vice_president,_sales_&_marketing.htm>—1 page (Mar. 2, 2000).
Sales Regions, Customer Support, Incredible Technologies™, <https://web.archive.org/web/20010221224021/http://www.goldentee.com:80/Support/Salesmap.htm>—1 page (Feb. 21, 2001).
Santa Ana Golf Club: Parview Premiers in New Mexico when Santa Ana Brings GPS Technology to their Golf Course, ParView—2 pages (Aug. 16, 2002).
Sarasota Business Owner is Awarded Florida's Young Entrepreneur of the Year, Press Room, ParView—1 page (Sep. 15, 2000).
Scoring Frenzy, Tech Toy, Entrepreneur—1 page.
SDF Summer Showcase, Software Development Forum—3 pages.
Search Course Maps, GolfPS™ Personal GPS Golf System, <https://web.archive.org/web/20020610040032/http://golfps.com:80/coursempas/searchcourses.asp>—2 pages (Jun. 10, 2002).
Search Results, Handango—Welcome to Handango,—3 pages (Aug. 6, 2001).
Seascape Resort: Serenity Meets Technology as the Seascape Resort Welcomes the Parview GPS System, ParView - 3 pages (Aug. 16, 2002).
Service and Support, Parview—2 pages (Jan. 28, 2001).
Sidener, IntelliGolf Tracks Scores, Statistics with Palm-top PCS, The Arizona Republic (Phoenix)—2 pages (Mar. 1, 1999).
Sidener, No Headline in Original, The Arizona Republic—2 pages (Mar. 1, 1999).
Sign Up: New Member Registration, iwingolf.com—2 pages (Jun. 4, 2002).
SkyCaddie® SGX User Guide—26 pages.
Small Biz Use Compaq iPAQ PocketPC to Revolutionize Industries, PR Newswire—4 pages (Apr. 22, 2002).
Software: Handango Downloads, Handspring: In Partnership with Handango—Software Home Page—1 page (May 3, 2002).
Software: Palm/Windows CE, PC Magazine—1 page (Feb. 23, 1999).
StarCaddy Enterprise, StarCaddy, <https://web.archive.org/web/20020510041326/http://www.starcaddy.com:80/enterprise.cfm>—2 pages (May 10, 2002).
StarCaddy Enterprise, StarCaddy, <https://web.archive.org/web/20021014161213/http://www.starcaddy.com:80/enterprise.cfm>—2 pages (Oct. 14, 2002).
StarCaddy Features, StarCaddy, <https://web.archive.org/web/20020604015729/http://www.starcaddy.com:80/features.cfm—4 pages (Jun. 4, 2002).
StarCaddy features, StarCaddy, <https://web.archive.org/web/20021014162808/http://www.starcaddy.com:80/features.cfm—4 pages (Oct. 14, 2002).
Steve Bush, Lower your Golf Score with Golfwits, Golf Today, Year 13, No. 12—4 pages(Aug. 2000).
Systems Benefits, ProLink—2 pages (Dec. 12, 2000).
Talk About the Clubhouse, In the News-Proshot.com, <https://web.archive.org/web/20010122071400fw_/http://www.proshot.com:80/news/index.html>—2 pages.
Technology Handy dandy, Golf Digest—2 pages (Jan. 2000).
Terms and Conditions, Wynit Inc.—(Jan./Feb. 2001).
The Club At Olde Cypress: Preservation Meets Progression; Harmony Results, ParView—2 pages (Aug. 16, 2002).
The Crossings Golf Club: The Historical Crossings Golf Course Makes History Again With the Addition of the Parview System, ParView—2 pages (Aug. 16, 2002).
The Global Positioning Systems (GPS) Resource Library, GPSy—9 pages (Feb. 8, 2001).
The Handango Champion, Palm OS® Edition, Issue #28—2 pages (Apr. 2002).
The index: things you should know., Esquire, vol. 135, No. 2—2 pages (Feb. 1, 2001).
The Mobile Office Outfitter Catalog, www.mobilegear.com—2 pages (1999).
The Palm VII, Tap Magazine: The #1 Resource for Palm/Pilot Users!, Issue 2.3—2 pages (Jul./Aug. 1999).
The ProLink Management Team, ProLink—11 pages.
The Seattle Times,—2 pages (Aug. 23, 1998).
The smartphone software store, Kyocera, <http://www.handango.com/kyocera-wireless/>—1 page (May 3, 2002).
Thompson, Now you really can look to the heavens for help with your handicap, National Post (Canada)—3 pages (Apr. 12, 2002).
Thorntown virtual golfer takes his shot at fame, The Indianapolis Star—3 pages (Nov. 13, 2001).
Through the Green at Highland Rim: Championship Course at Highland Rim Incorporates the Parview System into Their Distinctive Design, ParView—2 pages (Aug. 16, 2002).
Tiger Woods PGA Tour Golf for Game Body Advance, MobyGames, <http://www.mobygames.com/game/gameboy-advance/tiger-woods-pga-tour-golf>—6 pages (2002).
Tiger Woods PGA Tour Golf sur GameBoy Advance (Screenshots)—2 page.
Tips, StarCaddy, <https://web.archive.org/web/20020511115135/http://www.starcaddy.com:80/tips.cfm—3 pages (May 11, 2002).
Track Your Game, Golfps™ Personal GPS Golf System, <http://web.archive.org/web/20020610042520fw_/http://golfps.com:80/trackyourgame.htm>—2 pages (Jun. 10, 2002).
Trimble Survey Controller User Guide, Version 10.0, Revision A—504 pages (Jul. 2001).
Ultimate Gamer's Guide Directory, Handheld Computing, Issue 5.2—2 pages (Jun. 2002).
UpLink Enhanced Color Caddy, UpLink Golf, <https://web.archive.org/web/20020819002056/http://uplinkgolf.com:80/product/SpecSheets/EnchancedColorCaddy.htm>—2 pages (Aug. 19, 2002).
Vic Williams, For pure portability, IntelliGolf 'scores', Fairways &Greens, vol. 4, No. 6—2 pages (Jul. 2001).
Visor and GPS Photos (Front and Back)—2 pages.
Visor and IntelliGolf Photo (Back)—1 page.
Walters Golf: Vegas-Style Teams Up with Technology as Walters Golf Partners with Parview, ParView—3 pages (Apr. 18, 2002).
Webster et al., Accuracy of a Global Positioning System (GPS) for Weed Mapping, Weed Technology, vol. 11, No. 4—6 pages (1997).
Weingarten, A Smart Weapon for the Links: The G.P.S.—Enabled Golf Cart, The New York Times <https://www.nytimes.com/2002/09/05/technology/a-smart-weapon-for-the-links-the-gps-enabled-golf-cart.html>—3 pages (Sep. 5, 2002).
Welch et al., Cartographic feature extraction with integrated SIR-B and Landsat TM images, International Journal of Remote Sensing, vol. 9, No. 5—18 pages (1988).
Welcome to the CASSIOPEIA Software Store!, Casio: Powered by Handango—Software Home, <http://cassiopeia.sofware.casio.com/>—1 page (May 3, 2002).

(56) References Cited

OTHER PUBLICATIONS

Welcome to the ProLink Experience, Company Tour, ProLink—10 pages.
Welcome to the ProLink Experience, ProLink, <https://web.archive.org/web/20010331184035fw_/http://www.goprolink.com:80/nf/index1.htm—1 page (Oct. 31, 2001).
Welcome to the Third Annual Sacramento Chapter CSU, Chico Alumni Golf Tournament—2 pages (September 6).
Welcome, iwingolf.com—2 pages (Jun. 2, 2002).
Westridge Golf Club: History and Tradition Become Futuristic, ParView—2 pages (Jun. 14, 2002).
Whitestone Golf Club: Championship Course at Whitestone Integrates the Advanced Technology of the Parview GPS System, ParView—2 pages (Aug. 16, 2002).
Wylie, My Cyberlife, Denver Rocky Mountain News (CO)—2 pages (Oct. 29, 2001).
Yankee Run Golf Club: Award-Winning Yankee Run Triumphs Again with the Introduction of the Parview System, ParView—2 pages (Aug. 16, 2002).
ZIOGolf 1.2 Manual (2000)—17 pages.
ZIOGolf 2, Ziosoft, <https://archive.org/details.tucows_166046_ZIOGolf_2>—3 pages(Feb. 13, 2001).

\* cited by examiner

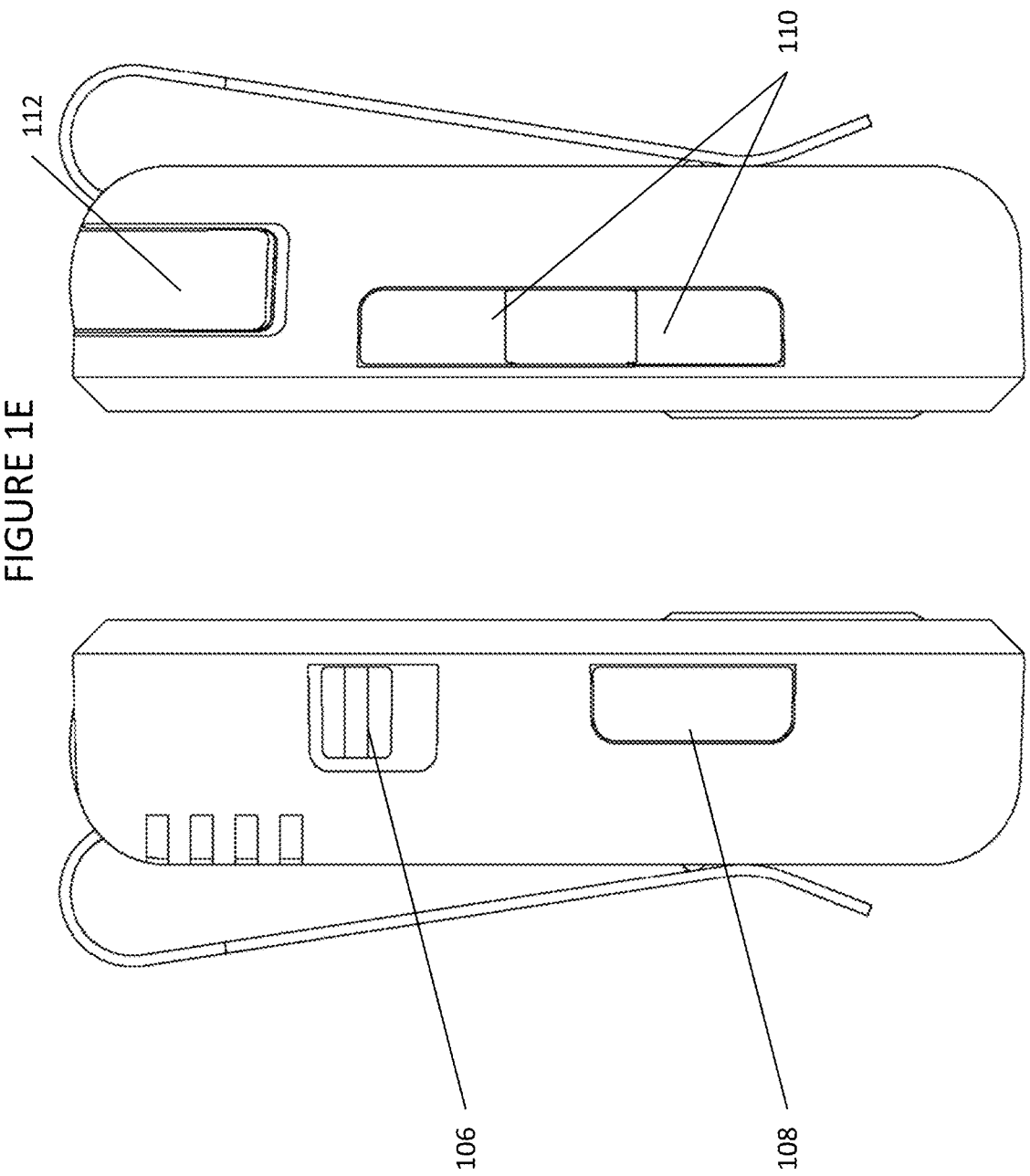

GOLF GPS DEVICE WITH HOLE RECOGNITION AND HOLE SELECTION

INCORPORATION BY REFERENCE TO ANY PRIORITY APPLICATIONS

This application is a continuation of U.S. application Ser. No. 16/381,766, filed Apr. 11, 2019, titled "GOLF GPS DEVICE WITH HOLE RECOGNITION AND HOLE SELECTION," which is a continuation of U.S. application Ser. No. 15/191,409, filed Jun. 23, 2016, titled "GOLF GPS DEVICE WITH HOLE RECOGNITION AND HOLE SELECTION," which is a continuation of U.S. application Ser. No. 13/936,123, filed Jul. 5, 2013, titled "GOLF GPS DEVICE WITH HOLE RECOGNITION AND HOLE SELECTION," which claims priority to U.S. Provisional Application No. 61/668,332, filed Jul. 5, 2012, and titled "GOLF GPS DEVICE WITH A HOT KEY TO RETURN TO AN IMMEDIATELY PREVIOUS HOLE," the disclosures of which are hereby incorporated by reference in their entirety herein. Any and all applications for which a foreign or domestic priority claim is identified in the Application Data Sheet as filed with the present application are hereby incorporated by reference under 37 CFR 1.57.

BACKGROUND

Field

The present disclosure relates to golf GPS devices.

Description of the Related Art

With the development of new technologies, GPS devices and systems can be employed to allow a golf player to track his or her location along a golf course. A golf GPS device can further be used to determine distances between the player and various points of interest along the golf course, such as the hole cup or green.

SUMMARY

One aspect provides a portable information processing and viewing device, which may comprise: a body housing a GPS receiver, a memory, one or more processors and a user interface, the body comprising a front surface and a rear surface; the GPS receiver configured to receive GPS information; the memory storing map information of golf courses, each comprising at least one hole and at least one feature on the hole; the one or more processors configured to determine a distance between the device and a location on a golf course stored in the memory as part of the map information; the user interface configured to provide a user with the determined distance, the user interface comprising a display screen on the front surface and a speaker housed in the body; a clip integrated with the body and comprising a spring plate that faces the rear surface; the one or more processors further configured to determine whether something is gripped between the spring plate and the rear surface by spring action of the spring plate; wherein when determining that no object is gripped between the spring plate and the rear surface, the display screen is configured to display the determined distance in a first orientation, and the speaker is configured to generate sound at a first volume of the determined distance in response to a user request; wherein upon determining that an object is gripped between the spring plate and the rear surface by spring action of the spring plate, the one or more processors are configured to cause the user interface to operate in a clip mode, which comprises one or more selected from the group consisting of i) not displaying the determined distance on the display screen, ii) displaying the determined distance on the display screen in a second orientation different from the first orientation, and iii) upon a user request, generating sound of the determined distance at a second volume higher than the first volume; and wherein upon determining that the object is ungripped between the spring plate and the rear surface, the one or more processors are configured to cause the user interface to return to the previous state of displaying the determined distance in the first orientation and generating sound at the first volume.

Another aspect provides golf GPS device, which may comprise: a GPS receiver configured to receive GPS information; a memory storing map information of golf courses, each comprising at least one hole and at least one feature on the hole; one or more processors configured to determine a distance between the device and a location on a golf course stored in the memory as part of the map information; a body comprising a front surface and a rear surface; a display module comprising a display screen provided on the front surface of the body and configured to display information; an audio module comprising a speaker housed in the body and configured to generate sound; a clip integrated with the body and comprising a spring plate that faces the rear surface; the one or more processors further configured to determine a mode of usage, in which the golf GPS device is used among a plurality of predetermined modes comprising a clip mode; and wherein, upon determining the clip mode, in which the golf GPS device is engaged with an object such that a portion of the object is gripped between the spring plate and the rear surface by spring action of the spring plate, the one or more processors are configured to cause the display module to stop displaying information that has been displayed on the display screen until the clip mode is canceled or disabled.

Still another aspect provides a golf GPS device, which may comprise: a GPS receiver configured to receive GPS information; a memory storing map information of golf courses, each comprising at least one hole and at least one feature on the hole; one or more processors configured to determine a distance between the device and a location on a golf course stored in the memory as part of the map information; a body comprising a front surface and a rear surface; a display module comprising a display screen provided on the front surface of the body and configured to display information; an audio module comprising a speaker housed in the body and configured to generate sound; a clip integrated with the body and comprising a spring plate that faces the rear surface; the one or more processors further configured to determine a mode of usage, in which the golf GPS device is used among a plurality of predetermined modes comprising a clip mode; and wherein, upon determining the clip mode, in which the golf GPS device is engaged with an object such that a portion of the object is gripped between the spring plate and the rear surface by spring action of the spring plate, the one or more processors are configured to cause the audio module to increase volume for sound to be generated by the speaker until the clip mode is canceled or disabled.

Yet another aspect provides a golf GPS device, which may comprise: a GPS receiver configured to receive GPS information; a memory storing map information of golf courses, each comprising at least one hole and at least one feature on the hole; one or more processors configured to determine a distance between the device and a location on a golf course stored in the memory as part of the map information; a body comprising a front surface and a rear surface; a display module comprising a display screen provided on the front surface of the body and configured to display information; an audio module comprising a speaker housed in the body and configured to generate sound; a clip integrated with the body and comprising a spring plate that faces the rear surface; the one or more processors further configured to determine a mode of usage, in which the golf GPS device is used among a plurality of predetermined modes comprising a clip mode; and wherein, upon determining the clip mode, in which the golf GPS device is engaged with an object such that a portion of the object is gripped between the spring plate and the rear surface by spring action of the spring plate, the one or more processors are configured to change the orientation of information displayed on the display screen from a first orientation to a second orientation different from the first orientation until the clip mode is canceled or disabled.

In the foregoing golf GPS devices, upon determining the clip mode, the one or more processors may be configured to deactivate the display screen. The one or more processors may be configured to determine at least one non-clip mode, in which no object is gripped between the spring plate and the rear surface, wherein, upon determining the at least one non-clip mode, the one or more processors may be configured to cause the display screen to begin or resume displaying information on the display screen. The one or more processors may be configured to determine the clip mode based on a user input to the golf GPS device. The device may be configured to provide the option of selecting one of the plurality of predetermined modes comprising the clip mode, wherein the user input may comprise selection of the clip mode.

Still in the foregoing golf GPS devices, the one or more processors may be configured to determine the clip mode without any user input to the golf GPS device, wherein the device may further comprise one or more sensors configured to monitor at least one physical property in either or both of the spring plate and the rear surface and further configured to provide information indicative of the monitored physical property to the one or more processors, wherein the at least one physical property may be selected from the group consisting of capacitance, resistance, piezoelectricity, electric current, electric potential, magnetism, pressure, tension, and deflection. The one or more sensors may comprise a first electrode in the clip and a second electrode on the rear surface or inside the body, wherein the one or more processors may be configured to determine the clip mode when detecting that at least one property in either or both of the spring plate and the rear surface reaches and exceeds a predetermined value with the grip of the portion of the object, wherein the one or more processors may be configured to determine a non-clip mode when detecting that at least one property in either or both of the spring plate and the rear surface falls behind the same or another predetermined value or lower with the grip of the portion of the object.

Yet in the foregoing golf GPS devices, when no object is gripped between the spring plate and the rear surface, the first and second electrodes may be in contact with each other, wherein upon gripping the object between the spring plate and the rear surface, the one or more sensors may monitor property indicative of disconnecting of the first and second electrodes. When no object is gripped between the spring plate and the rear surface, the first and second electrodes may be apart from each other at a gap therebetween, wherein upon gripping the object between the spring plate and the rear surface, the one or more sensors may monitor property indicative of increase of the gap. The one or more sensors may be configured to monitor deflection of a portion of the clip, wherein the one or more processors may be configured to determine the clip mode when detecting that the deflection reaches and exceeds a predetermined value, wherein the one or more processors may be configured to determine a non-clip mode when detecting that the deflection falls behind the same or another predetermined value. In the foregoing devices, the clip may be removable from the body while integrated with the body.

A further aspect provides a method of operating a golf GPS device. The method may comprise: providing the device of any one of the foregoing golf GPS device; determining a distance between the device and a location on a golf course stored in the memory as part of the map information; displaying the determined distance on the display screen in a first orientation; in response to a user request, generating sound of the determined distance from the speaker at a first volume; gripping an object by spring action of the spring plate by inserting a portion of the object between the spring plate and rear surface; determining, by the one or more processors, whether something is gripped between the spring plate and the rear surface by spring action of the spring plate; when no object is gripped between the spring plate and the rear surface, continuing to display the determined distance in the first orientation and generating sound at the first volume or at a user's adjusted volume in response to a user request; when determining that an object is gripped between the spring plate and the rear surface by spring action of the spring plate, causing the user interface to operate in a clip mode, which comprises one or more actions selected from the group consisting of i) stopping to display the determined distance on the display screen, ii) changing the orientation of the determined distance on the display screen from the first orientation to a second orientation different from the first orientation, and iii) increasing volume of sound of the determined distance to be generated upon a user request to a second volume higher than the first volume or the user's adjusted volume; and when determining that the object is ungripped between the spring plate and the rear surface, causing the user interface to return to the previous state of displaying the determined distance in the first orientation and generating sound at the first volume or the user's adjusted volume.

In the foregoing method, upon determining the clip mode, the one or more processors may deactivate the display screen. The one or more processors may determine at least one non-clip mode, in which no object is gripped between the spring plate and the rear surface, wherein, upon determining the at least one non-clip mode, the one or more processors may cause the display screen to begin or resume displaying information on the display screen. The one or more processors may determine the clip mode based on a user input to the golf GPS device. The device may provide the option of selecting one of the plurality of predetermined modes comprising the clip mode, wherein the user input comprises selection of the clip mode.

Still in the foregoing method, the one or more processors may determine the clip mode without any user input to the golf GPS device, wherein the device may further comprise one or more sensors configured to monitor at least one physical property in either or both of the spring plate and the rear surface and to provide information indicative of the monitored physical property to the one or more processors, wherein the at least one physical property may be selected from the group consisting of capacitance, resistance, piezo-electricity, electric current, electric potential, magnetism, pressure, tension, and deflection. The one or more sensors may comprise a first electrode in the clip and a second electrode on the rear surface or inside the body, wherein the one or more processors may determine the clip mode when detecting that at least one property in either or both of the spring plate and the rear surface reaches and exceeds a predetermined value with the grip of the portion of the object, wherein the one or more processors may determine a non-clip mode when detecting that at least one property in either or both of the spring plate and the rear surface falls behind the same or another predetermined value or lower with the grip of the portion of the object.

Yet in the foregoing method, when no object is gripped between the spring plate and the rear surface, the first and second electrodes may be in contact with each other, wherein upon gripping the object between the spring plate and the rear surface, the one or more sensors may monitor property indicative of disconnecting of the first and second electrodes. When no object is gripped between the spring plate and the rear surface, the first and second electrodes may be apart from each other at a gap therebetween, wherein upon gripping the object between the spring plate and the rear surface, the one or more sensors may monitor property indicative of increase the gap. The one or more sensors may be configured to monitor deflection of a portion of the clip, wherein the one or more processors may determine the clip mode when detecting that the deflection reaches and exceeds a predetermined value, wherein the one or more processors may determine a non-clip mode when detecting that the deflection falls behind the same or another predetermined value.

Further in the foregoing method, upon determining the clip mode, the one or more processors may cause the audio module or the user interface to increase volume for sound to be generated by the speaker until the clip mode is canceled. Upon determining the clip mode, in which the golf GPS device is engaged with an object using the clip, the one or more processors may change the orientation of information displayed on the display screen from a first orientation to a second orientation different from the first orientation.

The foregoing method may further comprise: for the clip mode, providing the user with the option for selecting one of i) not displaying the determined distance on the display screen, ii) displaying the determined distance on the display screen in the second orientation different from the first orientation, and iii) upon a user request, generating sound of the determined distance at a second volume higher than the first volume or the user's adjusted volume. The option for selecting may be provided to the user in a context of setting user preferences. The option for selecting may be provided upon determining that an object is gripped between the spring plate and the rear surface by spring action of the spring plate.

Yet in the foregoing method, the option of not displaying the determined distance may be pre-selected such that upon determining that an object is gripped between the spring plate and the rear surface by spring action of the spring plate, the one or more processors may cause the user interface to operate in the clip mode, which comprises not displaying the determined distance on the display screen. The option of displaying the determined distance in the second orientation may be pre-selected such that upon determining that an object is gripped between the spring plate and the rear surface by spring action of the spring plate, the one or more processors may cause the user interface to operate in the clip mode, which comprises displaying the determined distance on the display screen in the second orientation different from the first orientation. The option of generating sound at the second volume may be also pre-selected such that upon determining that an object is gripped between the spring plate and the rear surface by spring action of the spring plate, the one or more processors may cause the user interface to operate in the clip mode, which comprises not displaying the determined distance on the display screen and generating sound of the determined distance at the second volume. The method may further comprise: receiving a user request for changing the one or more pre-select options to one or more remaining options; in response to the request, changing the one or more pre-select options to one or more remaining options; and operating the user interface in the clip mode in the changed options.

Further in the foregoing method, the device may comprise a gyroscope, wherein the one or more processors may detect the orientation of the device based on information from the gyroscope, wherein the one or more processors are further configured to determine that the device is clipped with a golfer's headwear, in which a portion of the headwear is gripped between the spring plate and the rear surface, wherein upon determining that the device is clipped with a portion of the golfer's headwear, the one or more processors may cause the user interface to operate in the clip mode, in which the determined distance displayed on the display screen is turned off. The one or more processors may be configured to determine that the device is clipped with a golfer's headwear, when the front surface is generally facing away from the ground or the rear surface generally facing the ground for a predetermined period of time.

Still in the foregoing method, the device may comprise a gyroscope, wherein the one or more processors may detect the orientation of the device based on information from the gyroscope, wherein the one or more processors may further determine that the device is clipped with a golfer's waist belt, in which a portion of the golfer's waist belt is gripped between the spring plate and the rear surface, wherein upon determining that the device is clipped with a portion of the golfer's waist belt, the one or more processors may cause the user interface to operate in the clip mode, in which the orientation of the determined distance displayed on the display screen is changed to the second orientation. The one or more processors may be configured to determine that the device is clipped with a golfer's waist belt, when the front and rear surfaces is facing generally in a horizontal direction for a predetermined period of time. The device may comprise one or more temperature sensors, wherein the one or more processors may determine that the device is clipped with a golfer's waist belt, when a temperature detected on the side of rear surface is substantially higher than a temperature detected on the side of front surface. In the foregoing method, the clip may be removable from the body while integrated with the body.

One aspect of the invention provides a portable information processing and viewing device for use in a golf course comprising a plurality of holes, each of which is pre-assigned a particular hole number. The device may comprise: a GPS receiver configured to receive GPS information; one or more memory devices configured to store data; map data stored in the one or more memory devices, the map data comprising map information of each one of the plurality of holes; a display screen configured to display hole information and distance information; one or more processors configured to repeatedly determine in which one of the plurality of holes the device is located, to repeatedly compute a distance between the device and a feature of the determined hole, and to cause to display the hole number of the determined hole and the computed distance on the display screen, wherein the one or more processors are further configured to determine if the device has moved from one of the plurality of holes to another of the plurality of holes, once determined that the device has moved from a first one of the plurality of holes to a second one of the plurality of holes without passing another hole of the golf course, to determine whether or not the second hole is immediately subsequent to the first hole in terms of the pre-assigned hole numbers of the first and second holes in the golf course, and when determined that the second hole is not immediately subsequent to the first hole in terms of the pre-assigned hole numbers of the first and second holes in the golf course, to cause to display for selection by a user the hole numbers of the first and second holes on the display screen; upon the user's selection of the hole number of the first hole, to compute a first distance between the device and a feature of the first hole and cause to display the computed first distance on the display screen.

In the foregoing device, in addition to causing to display the hole numbers of the first and second holes, the one or more processors may be configured to further display at least one hole number of a hole, in which the device was previously located prior to the first hole. When determined that the second hole is immediately subsequent to the first hole, the one or more processors may be configured to compute a second distance between the device and a feature of the second hole and cause to display the computed second distance on the display screen. When determined that the second hole is immediately subsequent to the first hole, the one or more processors may be configured to display an inquiry to the user as to whether to proceed to the second hole or stay with the first hole.

Still in the foregoing device, when determined that the second hole is immediately subsequent to the first hole, the one or more processors may be configured to determine if the device has stayed within a predetermined zone of the first hole for a predetermined period or longer before moving to the second hole; and when determined that the device has not stayed within the predetermined zone or has stayed within the predetermined zone for a period shorter than the predetermined period before moving to the second hole, to compute the first distance between the device and the feature of the first hole and cause to display the computed first distance on the display screen. The map information of the first hole may include the predetermined zone, which comprises an arbitrarily defined area on a map of the first hole encompassing one or more selected from the group consisting of at least part of the green, a golf cart path next to the green, an area adjacent the green, and an area surrounding the green.

Yet in the foregoing device, when determined that the second hole is not immediately subsequent to the first hole, the one or more processors may be configured to compute the first distance and cause the first distance to be displayed on the display screen even before selection by the user. When determined that the second hole is not immediately subsequent to the first hole, the one or more processors may be configured to further compute a second distance between the device and a feature of the second hole and cause to display the second distance on the display screen in addition to the first distance even before selection by the user. When determined that the second hole is not immediately subsequent to the first hole, the one or more processors may be configured to not compute a second distance between the device and a feature of the second hole even before selection by the user.

Further in the foregoing device, the one or more memory devices may be configured to further store information of movement of the device on the golf course along with timestamps associated with the movement. When determined that the second hole is immediately subsequent to the first hole, the one or more processors may be configured to determine if the device has stayed within a predetermined zone of the first hole before moving to the second hole; and when determined that the device has not stayed within the predetermined zone, to compute the first distance between the device and the feature of the first hole and cause to display the computed first distance on the display screen, wherein the map information of the first hole may include the predetermined zone, which comprises an arbitrarily defined area on a map of the first hole encompassing one or more selected from the group consisting of at least part of the green, a golf cart path next to the green, an area adjacent the green, and an area surrounding the green.

Still in the foregoing device, when determined that the second hole is immediately subsequent to the first hole, the one or more processors may be configured: to determine if the device has stayed within a predetermined zone of the first hole for a predetermined period or longer before moving to the second hole; and when determined that the device has stayed within the predetermined zone for the predetermined period or longer, only then to compute a second distance between the device and a feature of the second hole and cause to display the computed second distance on the display screen, wherein the map information of the first hole includes the predetermined zone, which comprises an arbitrarily defined area on a map of the first hole encompassing one or more selected from the group consisting of at least part of the green, a golf cart path next to the green, an area adjacent the green, and an area surrounding the green.

Yet in the foregoing device, each hole may comprise a green and a tee-off area, wherein each hole map information may comprise locational information of the green and locational information of the tee-off area and the hole number pre-assigned to that hole. The feature of the first hole may comprise a position of or associated with the green of the first hole, wherein the position of or associated with the green may be predetermined and included in the map information of the first hole or chosen by a predetermined algorithm at the time of computing the first distance. Each hole map information may comprise a predetermined area defined with a boundary line or boundary lines on a map of that hole, wherein the boundary line or lines of the predetermined area does not accurately follow the boundary of the hole as published by the golf course, wherein the predetermined area may be used for determining whether the device is located within the hole such that when the device is located within the predetermined area of the second hole, then the one or more processors are configured to determine that the device is located in the second hole. The predetermined area of each hole does not encompass a portion of the hole, wherein the one or more processors may be configured to determine that the device remains located in the first hole once the device is within the predetermined area of the first hole and leaves the predetermined area of the first hole as long as the device does not enter the predetermined area of another hole. The one or more processors may be configured to determine that the device has moved from the first hole to the second hole, when the device travels from a location within the predetermined area of the first hole to outside the predetermined area of the first hole, and then enters the predetermined area of the second hole.

Another aspect of the invention provides a method of operating a portable information processing and viewing device in a golf course comprising a plurality of holes, each of which is pre-assigned a particular hole number. The method may comprise: providing the foregoing device; receiving GPS information via the GPS receiver; determining a location of the device using the GPS information; determining one of the plurality of holes, in which the GPS device is located; computing a distance between the device and a feature of the determined hole of the golf course; displaying the hole number of the determined hole and the computed distance on the display screen; further determining if the device has moved from one of the plurality of holes to another of the plurality of holes; once determined that the device has moved from a first one of the plurality of holes to a second one of the plurality of holes, determining whether or not the second hole is immediately subsequent to the first hole in terms of the pre-assigned hole numbers of the first and second holes in the golf course, and when determined that the second hole is not immediately subsequent to the first hole in terms of the pre-assigned hole numbers of the first and second holes in the golf course, displaying for selection by a user the hole numbers of the first and second holes on the display screen; upon the user's selection of the hole number of the first hole, computing a first distance between the device and a feature of the first hole and displaying the computed first distance on the display screen.

The foregoing method may further comprise: when determined that the second hole is immediately subsequent to the first hole, computing a second distance between the device and a feature of the second hole and displaying the computed second distance on the display screen. When determined that the second hole is immediately subsequent to the first hole, the foregoing method may further comprise: determining if the device has stayed within a predetermined zone of the first hole for a predetermined period or longer before moving to the second hole; and when determined that the device has not stayed within the predetermined zone or has stayed within the predetermined zone for a period shorter than the predetermined period before moving to the second hole, computing the first distance between the device and the feature of the first hole and cause to display the computed first distance on the display screen, wherein the map information of the first hole includes the predetermined zone, which comprises an arbitrarily defined area on a map of the first hole encompassing one or more selected from the group consisting of at least part of the green, a golf cart path next to the green, an area adjacent the green, and an area surrounding the green.

In an embodiment, a golf GPS device comprises a front surface comprising a display screen configured to display information related to location data that the golf GPS device has been tracking in relation to a golf course, a back surface substantially parallel to the front surface and facing away from the front surface, wherein the back surface is partially covered by a clip configured to attach the golf GPS device to a player using the golf GPS device, one or more circumferential surfaces interconnecting the front and back surfaces, and a speaker configured to audibly report information related to location data that the golf GPS device has been tracking in relation to the golf course, wherein the golf GPS device is capable of determining whether the golf GPS device is clipped, wherein upon determining that the golf GPS device is clipped, the display screen of the golf GPS device automatically turns off. In some embodiments, upon determining that the golf GPS device is not clipped, the display screen of the golf GPS device above automatically turns on.

In an embodiment, a method of changing on a golf GPS device a particular hole of a golf course that the golf GPS device is tracking a location of the player against when the golf GPS device is located on or near the player, wherein the player while playing on a first hole of the golf course temporarily steps onto a second hole before finishing playing on the first hole, wherein the second hole is neighboring the first hole, and wherein the golf GPS device automatically identifies that the player is playing on the second hole and begins to track the location of the player against the second hole, comprises receiving by the golf GPS device a unique input from the player to revert back to tracking the location of the player against the first hole, identifying by the golf GPS device upon the unique input a hole the golf GPS device was tracking the location of the player against immediately prior to tracking the location of the player against the second hole, which is the first hole, and determining by the golf GPS device using at least one GPS satellite a plurality of distances between the player and a plurality of locations along the first hole, wherein the plurality of locations along the first hole comprises a location of a hole cup of the first hole, wherein the golf GPS device comprises at least a computer processor and an electronic storage medium. In some embodiments, the second hole neighboring the first hole in the above method is not sequentially a subsequent hole to play after playing at the first hole.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which:

FIGS. 1A-1F illustrate the front, back, and circumferential surfaces of the golf GPS device.

DETAILED DESCRIPTION OF EMBODIMENTS

Embodiments of the invention will now be described with reference to the accompanying figures. The terminology used in the description presented herein is not intended to be interpreted in any limited or restrictive manner, simply because it is being utilized in conjunction with a detailed description of certain specific embodiments of the invention. Furthermore, embodiments of the invention may comprise several novel features, no single one of which is solely responsible for its desirable attributes or which is essential to practicing the inventions herein described.

As used herein, the terms "golf GPS device" and "device" may be used interchangeably. Further, as used herein, the terms "player," "user," and "player-user" may be used interchangeably.

Golf GPS Device with Clip

A golf GPS device including an integrated clip is typically clipped with a golfer's headwear or waist belt. In a golf GPS device including a display screen, when the device is clipped with the golfer's headwear such as a cap or hat, it would be difficult for the golfer to read the information displayed on the display screen because the display screen would likely face away from the golfer's eyes. In such a situation, the battery power of the golf GPS device will be wasted for the time when the golf GPS device is clipped with golfer's headwear. It would be better to turn off the display screen when the golf GPS device determines that it is clipped with the golfer's headwear.

Also, when the golf GPS device is clipped with the golfer's waist belt, it would be difficult for the golfer to read information displayed on the display screen because the information would be upside down for the golfer's eyes. It would be helpful for the golfer to read the information if the information displayed on the display screen is displayed upside down when the golf GPS device determines that it is clipped with the golfer's waist belt.

Further, some golf GPS devices with an audio module that generates the sound of certain information about the golf courses and golf plays, such as the distance of the golf GPS device to the green of the hole the golfer is playing. Sometimes such a golf GPS device is carried near the golfer's ears. In other times such a golf GPS device is carried somehow away from the golfer's ears, for example, when the GPS device is kept or clipped with golfer's waist belt. In such a situation, it would be helpful that the golf GPS device turns off the volume of the sound when it determines that it is clipped with the golfer's waist belt.

General Structure and Operation

Figure 7:
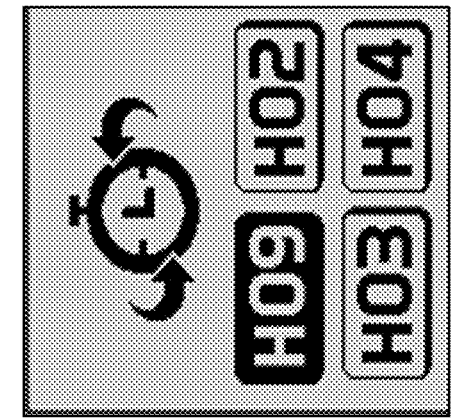
FIG. 7 illustrates a display screen of a golf GPS device in accordance with an embodiment.

In embodiments, a portable information processing and viewing device is provided. Referring to FIGS. 1 and 7, the device includes a body housing a GPS receiver 302, a memory 306, one or more processors 300 and a user interface, the body comprising a front surface and a rear surface. The GPS receiver receives GPS information transmitted from satellites. The memory stores map information or map data 308 of golf courses, each of which includes at least one hole and at least one feature on the hole. The one or more processors determine a distance between the device and a location on a golf course stored in the memory as part of the map information. The user interface provides a user with the determined distance. The user interface includes a display screen 304 on the front surface and a speaker 310 housed in the body.

In embodiments, the device further includes a clip integrated with the body. The clip includes a spring plate that faces the rear surface of the body of the GPS device. In one embodiment, the clip may be disintegrated from the GPS device. Based on input from one or more sensors or sensing elements, the one or more processors further determine whether something is gripped between the spring plate and the rear surface by spring action of the spring plate. When determining that no object is gripped between the spring plate and the rear surface, the display screen displays the determined distance in a first orientation, and the speaker generates sound at a first volume of the determined distance in response to a user request.

In embodiments, upon determining that an object is gripped between the spring plate and the rear surface by spring action of the spring plate, the one or more processors cause the user interface to operate in a clip mode, which includes one or more selected from the group consisting of i) not displaying the determined distance on the display screen, ii) displaying the determined distance on the display screen in a second orientation different from the first orientation, and iii) upon a user request, generating sound of the determined distance at a second volume higher than the first volume. Upon determining that the object is ungripped between the spring plate and the rear surface (i.e., the object is disengaged or removed from the spring plate of the clip) the one or more processors cause the user interface to return to the previous state of displaying the determined distance in the first orientation and generating sound at the first volume.

In embodiments, the one or more processors determine the clip mode based on a user input to the golf GPS device. In another embodiment, the one or more processors determine the clip mode based on information transmitted from one or more sensors, which are discussed below.

A golf GPS device can be used to track a player's location and ranges in real-time while playing on a golf course. In an embodiment, a golf GPS device comprises a GPS module, processor, memory, input, and output. The GPS module, processor, memory, input, and output can be chosen from ones that are currently well known and commercially available or those that are to be developed in the future. For example, the output can include one or more displays configured to visually convey information and/or speakers configured to verbally convey information. The input can include one or more sensors and/or mechanical, electrical, and digital buttons that facilitate a user to instruct the device to perform certain functions. More than one buttons and/or sensors may be utilized in combination for a particular function.

It is understood that the various inputs and outputs described herein may be located on any surface of the golf GPS device other than as shown in the depicted embodiments. It is further understood that the various inputs and outputs described herein may be combined into fewer components and that each input and/or output can be configured to perform other functions in addition to those shown in the depicted embodiments.

Golf GPS Device with Automatic Hole Recognition

Many golf GPS devices now have the feature of automatic hole recognition, which is to determine the particular hole in which the GPS device is located as the user travels along the golf course as the golf play proceeds. For example, the automatic hole recognition feature determines if the location of the GPS device is within a predetermined area or boundary of a particular one of the plurality of holes of golf course. The golf GPS device will include map information of the golf course, which includes the predetermined area or the boundary of such an areas for the automatic hole recognition feature. In such a device, when the user or golfer travels from one hole to another, e.g., from a predetermined area of one hole to a predetermined area of the other hole, the GPS device will automatically recognize the movement of the golfer from one hole to the other.

Golf GPS Device with Playing Hole Determination

During a play in a hole, sometimes golfers travel to another hole before finishing the play in the particular hole for various reasons. For example, a golfer playing in one hole (e.g., Hole 4) hits by mistake her ball to an area of another hole (e.g., Hole 11) that is adjacent to the hole (Hole 4) she is playing. Then, the golfer travels to the other hole (Hole 11) to complete her play for the playing hole (Hole 4). When the golfer uses a golf GPS device with the automatic hole recognition feature, the GPS device will recognize the other hole (Hole 11) when the golfer travels from her playing hole (Hole 4) to the hole in which her ball is located (Hole 11), e.g., when her golf GPS device enters a predetermined area of the other hole (Hole 11).

As the golf GPS device recognizes the other hole (Hole 11), the device will automatically compute and display on its screen the distance between the device and the green (or a position on the green) of the other hole (Hole 11). Sometimes this automatic actions of the device may confuse the golfer as the information displayed on the screen is different from what the golfer will likely look for, i.e., the distance between the device and the green (or a portion of the green) of the playing hole (Hole 4). In case the golfer recognizes that the displayed information is not what she is looking for, then the golfer would need to override what the device has done by changing the hole (Hole 11) that the device automatically recognized to the hole (Hole 4) that the golfer is playing. To do that the golfer should know how to change the hole that she is playing in the device. Typically such a change would require multiple actions of the golfer such as changing the currently displayed hole to the next hole (either immediately previous or subsequent hole) of the golf course until the golfer reaches the playing hole. When the playing hole is Hole 4 and the currently displayed hole is Hole 11, the golfer may have to transition the hole from Hole 11 to Hole 10, then to Hole 9 . . . until Hole 4 is displayed.

In embodiments of the invention, when the golf GPS automatically recognizes the change of holes, then the device automatically determines whether the new hole is immediately subsequent to the previously displayed hole. Further the golf GPS device provides a user interface in which two or more hole numbers are displayed for selection of the golfer. Then, the golfer can select the appropriate hole based on the status of the golf game. In other embodiments, the golf GPS device is equipped with a physical or electronic hot key for returning to the previously played hole when the device recognizes the hole change and has displayed information of the new hole. When the golfer hits the hot key, then the golf GPS device displays the information of the previously played hole.

Predetermined Area

The predetermined area or boundary for automatic hole recognition feature can vary from hole to hole. In embodiments, the predetermined area covers only a portion of a particular hole or covers substantially all area of a particular hole. In some embodiments, the predetermined area covers certain portions of a particular hole in which typically golfers travel when advancing to the next hole during golf plays. In some embodiments, the predetermined area of a hole covers the tee-off area of the hole. In some embodiments, one hole may have more than one predetermined area.

User's Option in the Clip Mode

In embodiments, for the clip mode, the device provides the user with the option for selecting one of i) not displaying the determined distance on the display screen, ii) displaying the determined distance on the display screen in the second orientation different from the first orientation, and iii) upon a user request, generating sound of the determined distance at a second volume higher than the first volume or the user's adjusted volume. Such option for selecting is provided to the user in a context of setting user preferences. In one embodiment, the option for selecting is provided upon determining that an object is gripped between the spring plate and the rear surface by spring action of the spring plate.

Pre-Selected Option for the Clip Mode

In embodiments, the option of not displaying the determined distance is pre-selected such that upon determining that an object is gripped between the spring plate and the rear surface by spring action of the spring plate, the one or more processors cause the user interface to operate in the clip mode, which includes not displaying the determined distance on the display screen. In one embodiment, the option of generating sound at the second volume is also pre-selected such that upon determining that an object is gripped between the spring plate and the rear surface by spring action of the spring plate, the one or more processors cause the user interface to operate in the clip mode, which includes not displaying the determined distance on the display screen and generating sound of the determined distance at the second volume.

In embodiments, the option of displaying the determined distance in the second orientation is pre-selected such that upon determining that an object is gripped between the spring plate and the rear surface by spring action of the spring plate, the one or more processors cause the user interface to operate in the clip mode, which includes displaying the determined distance on the display screen in the second orientation different from the first orientation. In one embodiment, the option of generating sound at the second volume is also pre-selected such that upon determining that an object is gripped between the spring plate and the rear surface by spring action of the spring plate, the one or more processors cause the user interface to operate in the clip mode, which includes not displaying the determined distance on the display screen and generating sound of the determined distance at the second volume.

In some embodiments, a user request for changing the one or more pre-select options to one or more remaining options can be received. In response to the request, the device changes the one or more pre-select options to one or more remaining options, and operates the user interface in the clip mode in the changed options.

Memory

In some embodiments, the memory is sufficiently large as to store data of many different golf courses from around the world. Each course can have 9 or 18 holes. Further, in certain embodiments, audio and visual data in multiple languages can be stored in the memory.

Device Specification

In an embodiment, the size of golf GPS device described herein is relatively small compared to those that are generally available in the market as of the filing of this application. For example, in some embodiments, the front and back surfaces of the golf GPS device are smaller than about 5 cm long and about 5 cm wide. In certain embodiments, the device is less than about 2 cm thick. In some embodiments, the golf GPS device is about 4.28 cm long, about 4.28 cm wide, and about 1.1 cm thick. In an embodiment, the golf GPS device is less than about 30 g in weight including the battery. In some embodiments, the golf GPS device is about 28 g in weight including the battery.

General External Structure

Figure 1A:
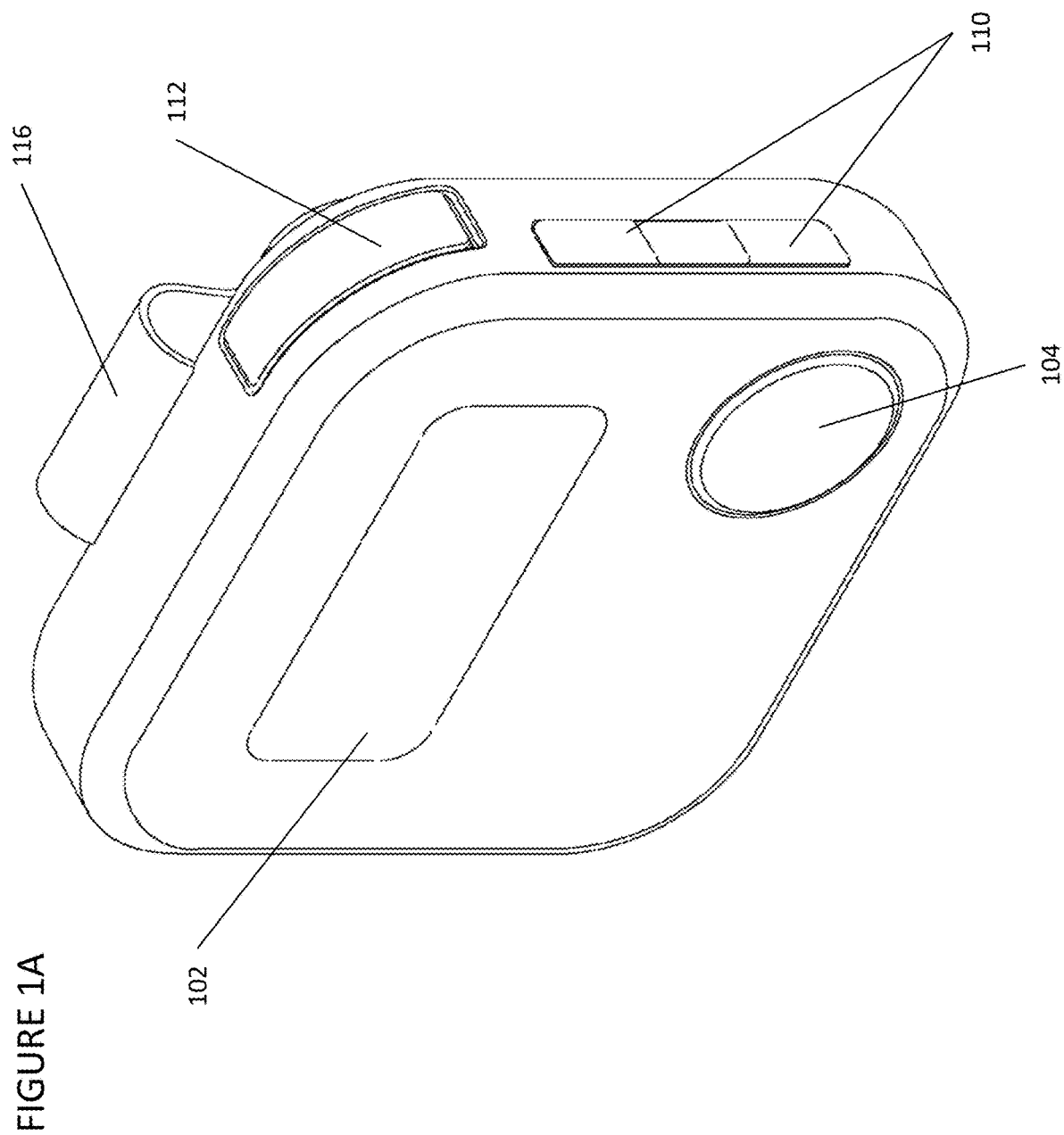
Figure 1B:
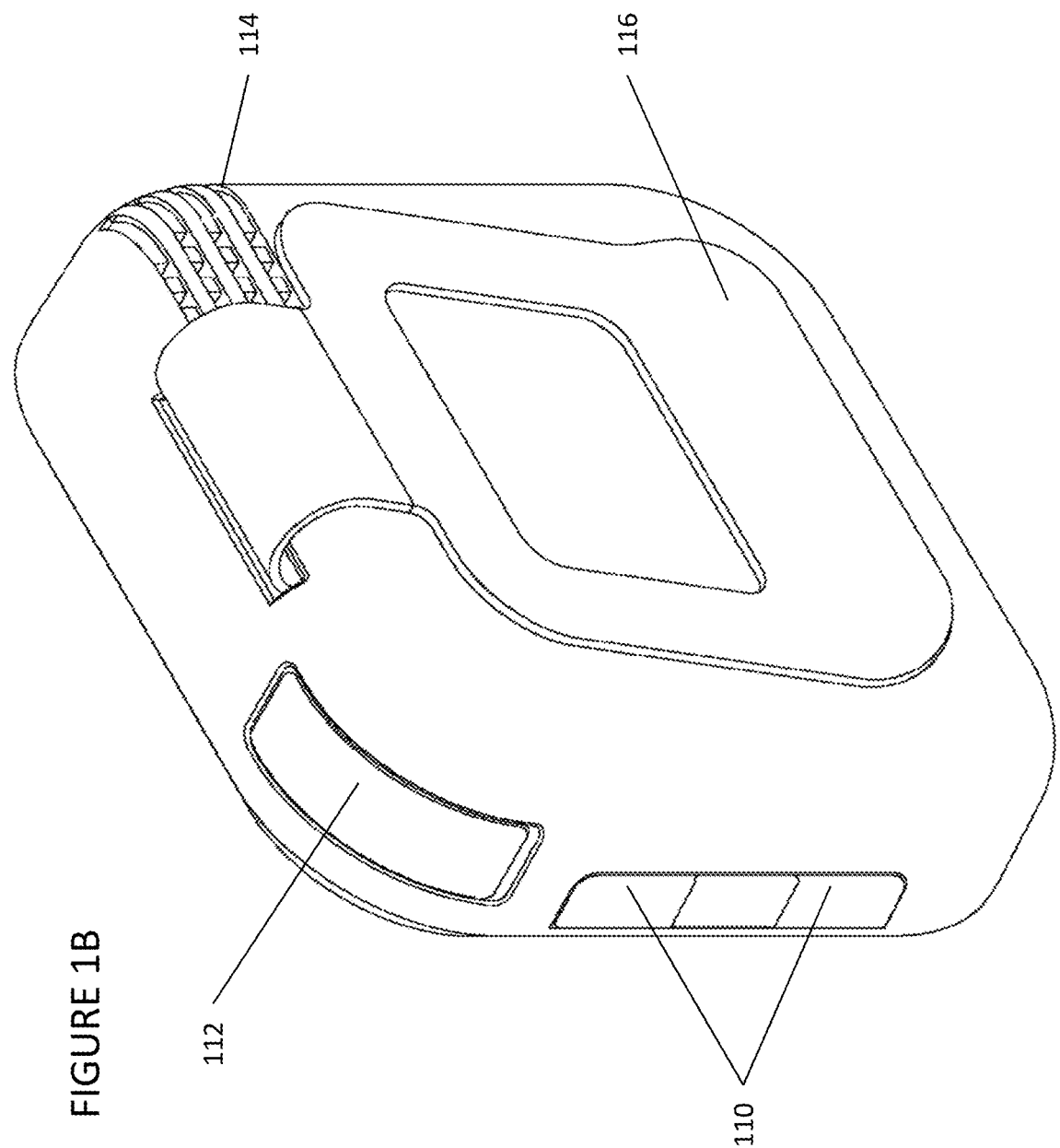

In an embodiment, the golf GPS device has a front surface (FIG. 1C), a back surface (FIG. 1D), and a plurality of circumferential surfaces (FIGS. 1E-1F) that interconnect the front surface and the back surface. FIGS. 1A and 1B illustrate an overview of the general external structure of one embodiment of the golf GPS device.

Front Surface

Figure 1C:
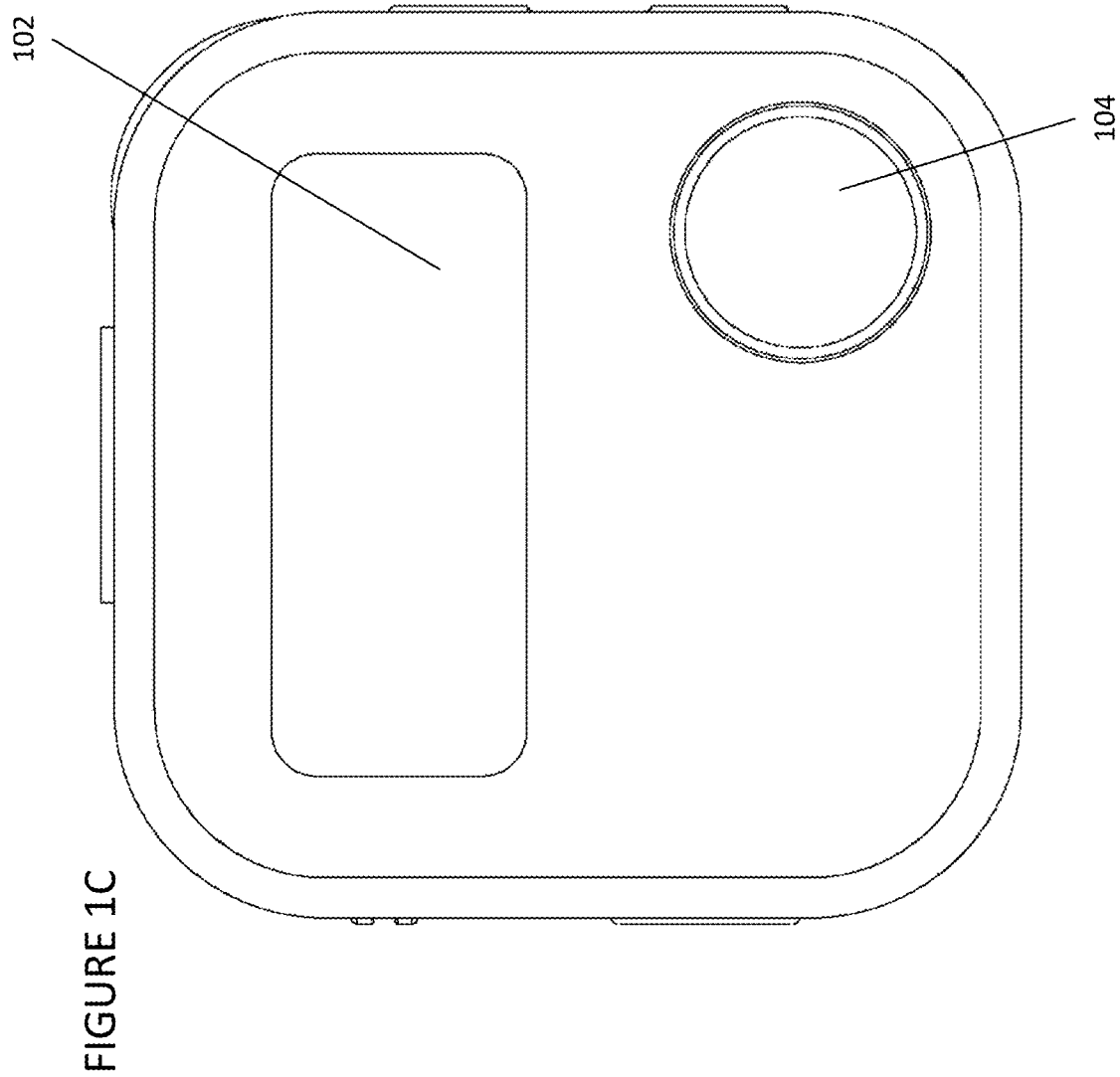

FIG. 1C illustrates the front surface of one embodiment of the golf GPS device. In the depicted embodiment, the front surface of the golf GPS device comprises a display 102 and main button 104.

Display

In an embodiment, the golf GPS device can comprise one or more displays. In some embodiments, the display is an LCD screen although not limited thereto. In other embodiments, the display is an LED screen or any other display means to be developed. In certain embodiments, the display is a color display. In other embodiments, the display is not a color display but is grayscale.

In some embodiments, the display covers substantially the whole front surface, back surface, or one or more circumferential surfaces. In other embodiments, the display covers only a portion of the front surface, back surface, or one or more circumferential surfaces. For example, the display can be about one half the front surface area or smaller.

In some embodiments, the display is configured to display details of a golf course where the golf GPS device is currently located. Such details can include the distance between the golf GPS device's current location and various locations along the course of a particular hole. Such locations can include the front of the green, back of the green, center of the green, front of a hazard, back of a hazard, front of the fairway, back of the fairway, the hole cup, and any other notable locations along a golf course. The display can be further configured to display details of a golf course of the user's choice. In other embodiments, the display is configured to display only a map of the green of a particular hole. For example, the particular hole can be where the golf GPS device is currently located. In some embodiments, the display is configured to display the hole number and/or par number of the hole the device is currently located at or any other hole.

Main Button

In an embodiment, the golf GPS device can comprise a main button configured to initiate particular functions when pressed by a user.

In some embodiments, when a user presses the main button, the golf GPS device recognizes that the main button is pressed and informs the user of the distance from the device to the green. For example, the device can audibly report the distance to the user via one or more speakers or the device can visually display the distance to the user via one or more displays.

In certain embodiments, when a user presses and holds the main button for longer than a particular period of time, the device switches between determining the distance from the device to the front of the green, back of the green, and center of the green. The particular period of time can be, for example, about 1 second, about 2 seconds, about 3 seconds, about 4 seconds, about 5 seconds, or any other time period.

Back Surface

Figure 1D:
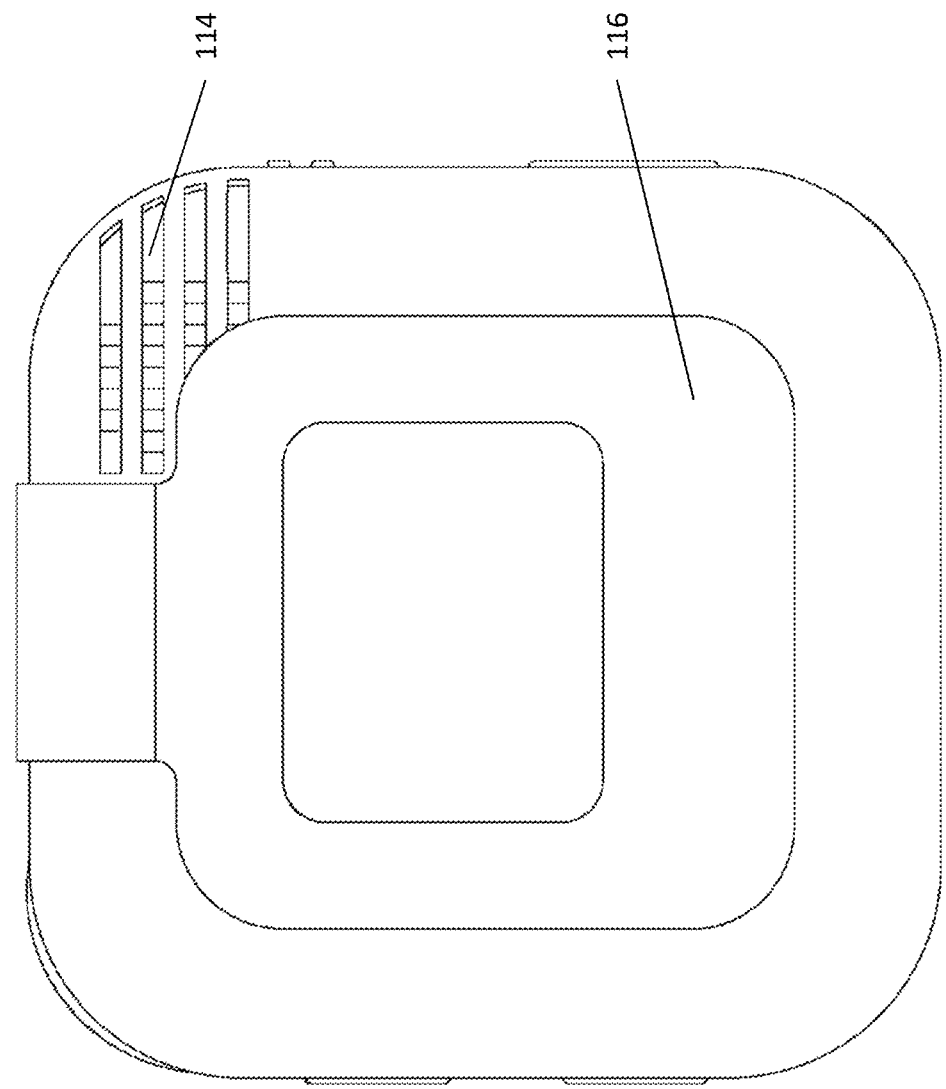

FIG. 1D illustrates the back surface of one embodiment of the golf GPS device. In the depicted embodiment, the back surface of the golf GPS device comprises a speaker(s) 114 and a clip 116.

Speaker

In an embodiment, the golf GPS device can comprise one or more speakers. In some embodiments, the speaker is located on the back surface of the golf GPS device. In other embodiments, the speaker is located on the front surface or one or more circumferential surfaces.

In an embodiment, the speaker is configured to audibly report to the user information relating to distances and/or other features of the golf course. For example, the device can be configured to audibly report to the user the distance between the golf GPS device's current location and various locations along the course of a particular hole. Such locations can include the front of the green, back of the green, center of the green, front of a hazard, back of a hazard, front of the fairway, back of the fairway, the hole cup, and any other notable locations along a golf course. In some embodiments, the golf GPS device can report such distances and/or features to the user in more than one language. In certain embodiments, the golf GPS device can also audibly report to the user the hole number, par number, and/or name of the golf course where the device is currently located.

In some embodiments, the voice reporting may be only activated upon receiving instructions from a user. For example, the instruction can be pressing a button on the device or other method of input.

Clip

Figure 3:
FIG. 3 illustrates one embodiment of the golf GPS device when clipped onto a hat.
Figure 4:
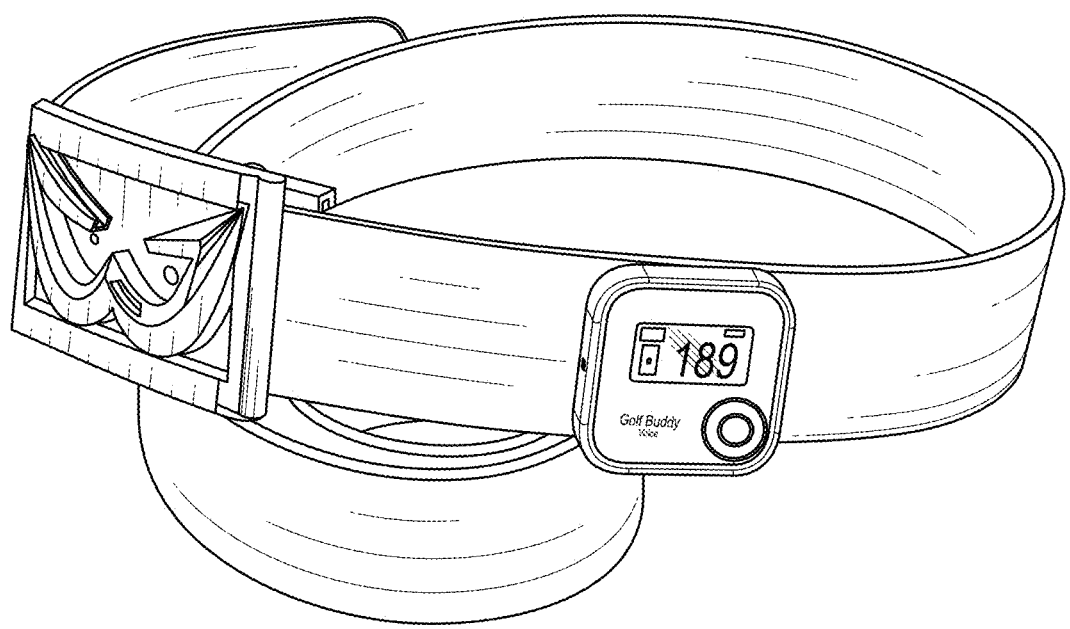
FIG. 4 illustrates one embodiment of the golf GPS device when clipped onto a belt.
Figure 5A:
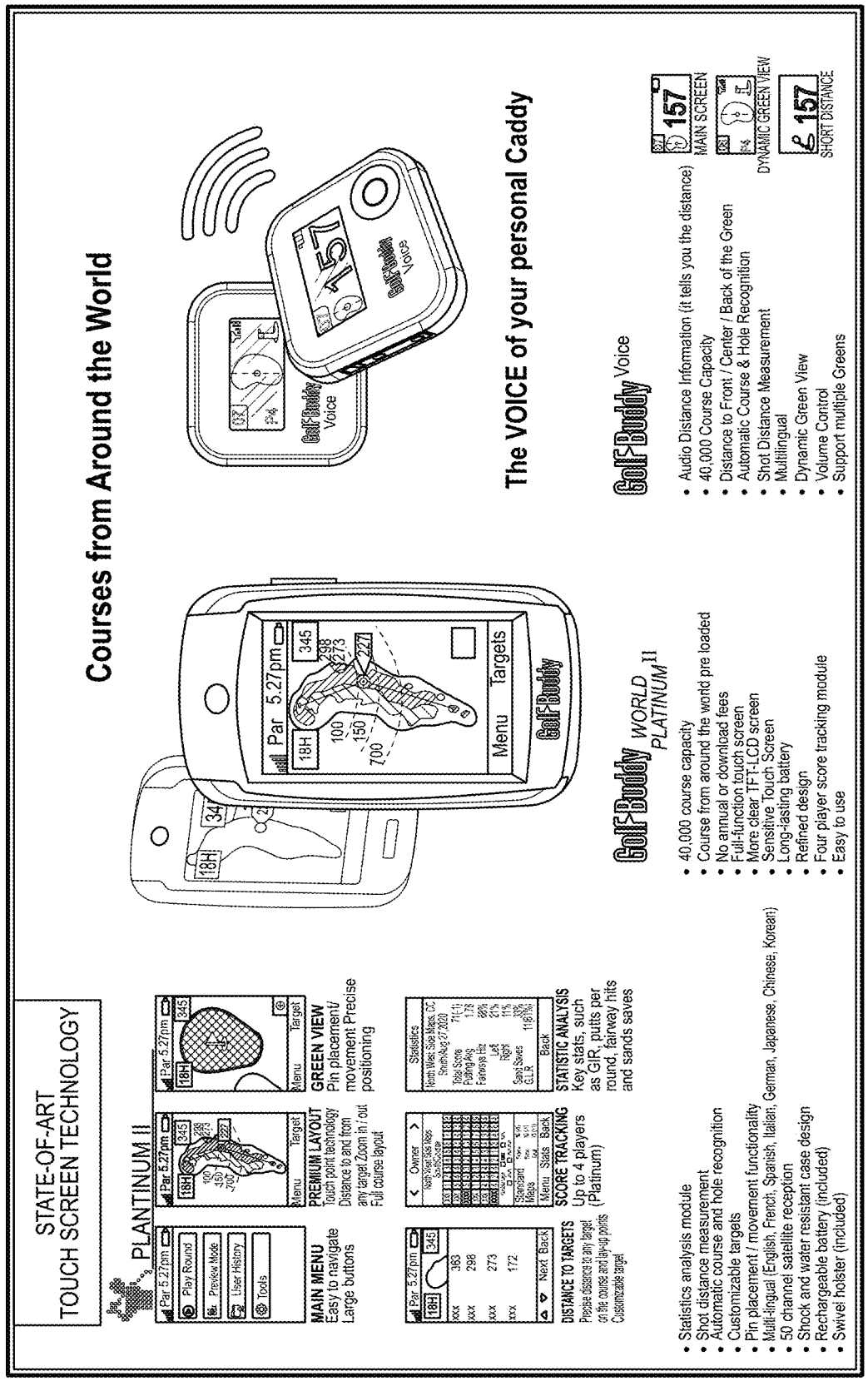
FIGS. 5A and 5B illustrate features of one embodiment of the golf GPS device.
Figure 5B:
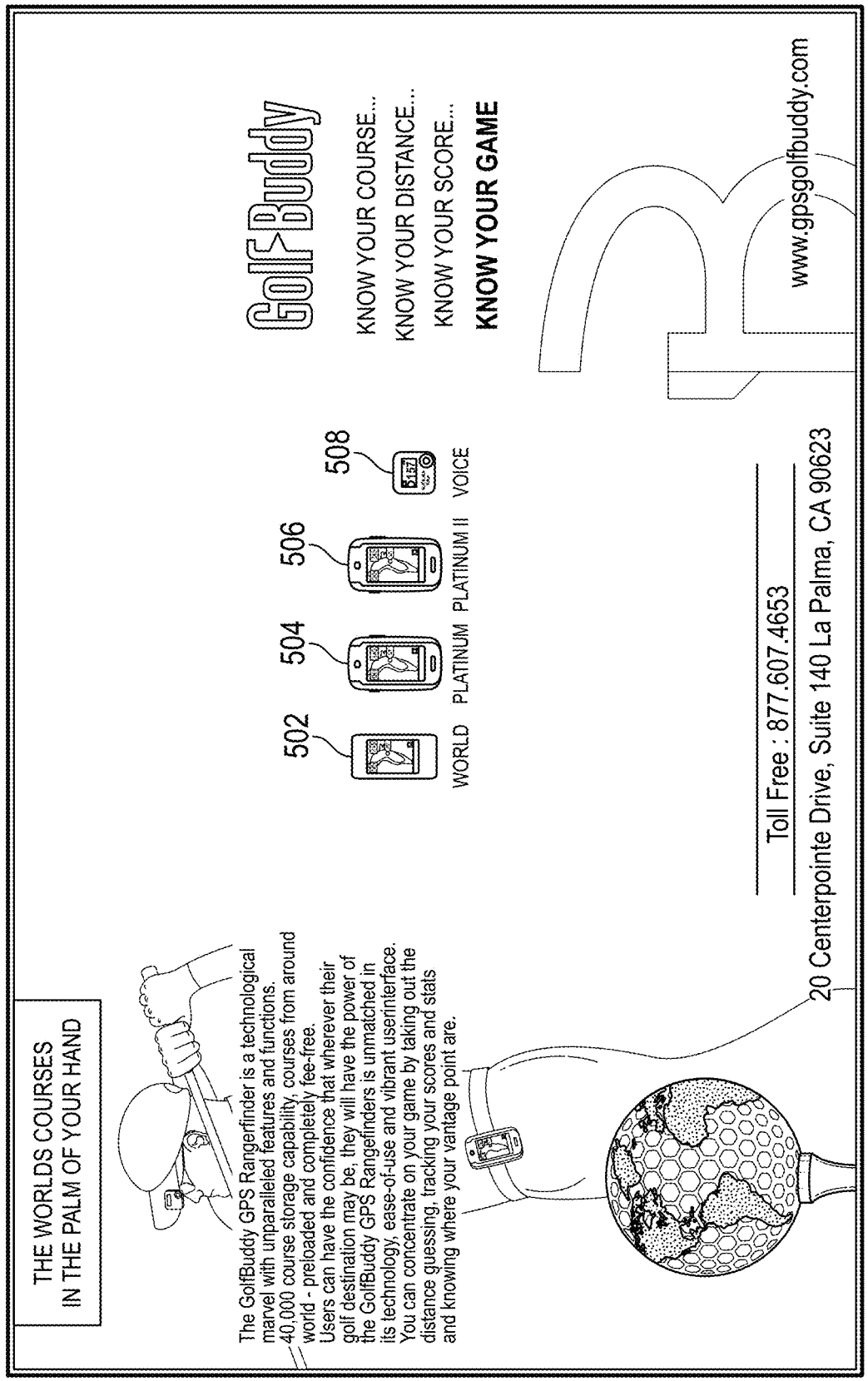
Figure 6:
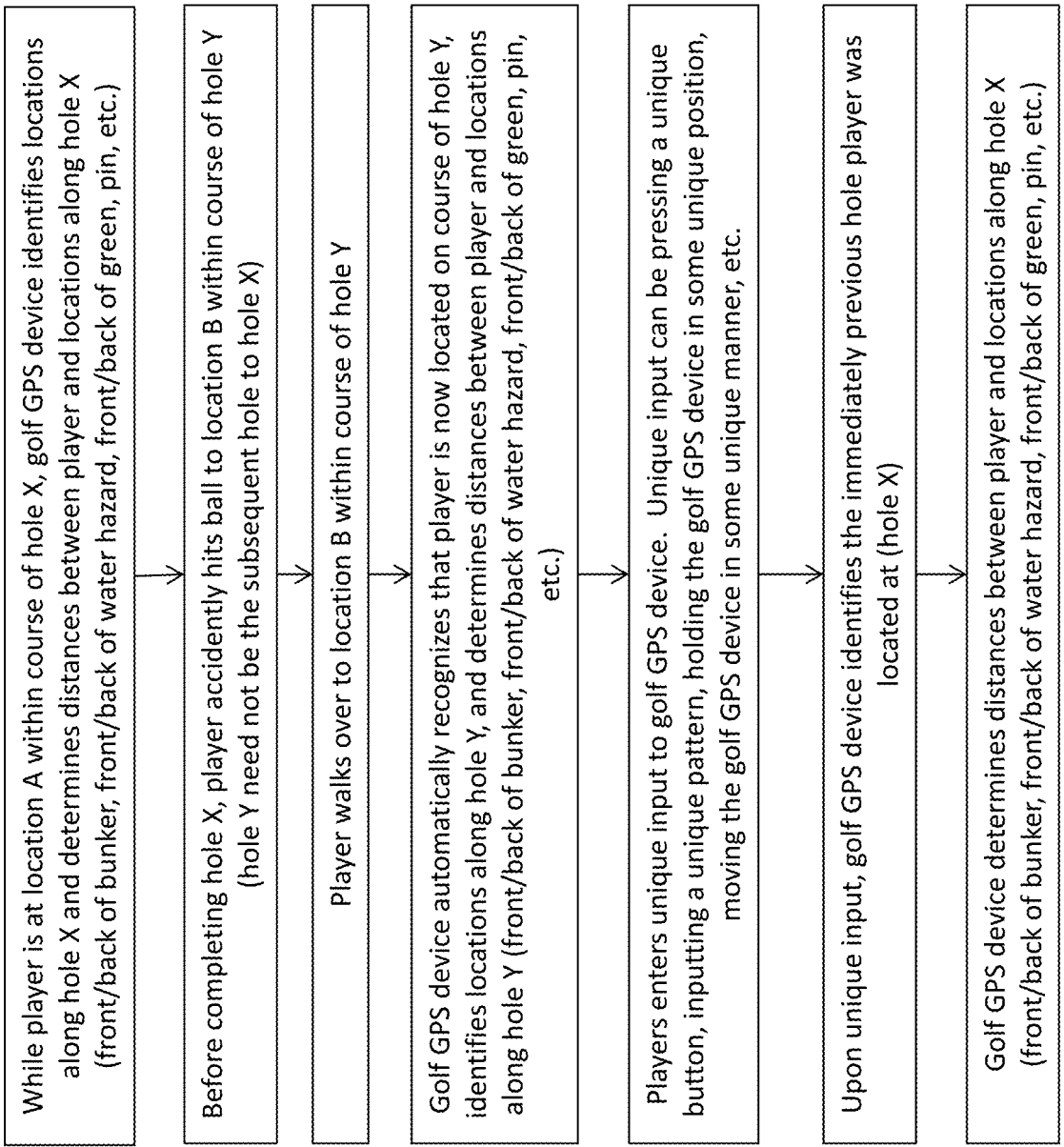
FIG. 6 is a flowchart depicting the context and use of one embodiment of a hot key on the golf GPS device configured to revert the golf GPS device to track the immediately previous hole.

In an embodiment, the golf GPS device has a clip on the device. In the depicted embodiment, the clip 114 is located over a portion of the back surface. In some embodiments, the clip is attached to the back surface of the device. In certain embodiments, the clip is attached to a circumferential surface of the device. In other embodiments, the clip is attached to the front surface of the device. Such clip can be used to attach the device to a player/user. In some embodiments, the clip can be used to attach the device to an article of clothing of the player/user. For example, the clip can be used to attach the device to a hat as depicted in FIG. 3. Also, the clip can be used to attach the device to a belt as depicted in FIG. 4.

In embodiments, the clip or a portion of the clip is electrically connected to a circuit or a sensor so as to detect clipping or grip by the sensor. In some embodiments, the integrated clip can be removed, i.e., disintegrable from the body without use of any tools. In one embodiment, the body of the GPS device includes a structure such as slot or slit for engaging with the clip. The clip can then be removed from or disengaged with the such a structure to be disintegrated.

Circumferential Surfaces

Figure 1F:
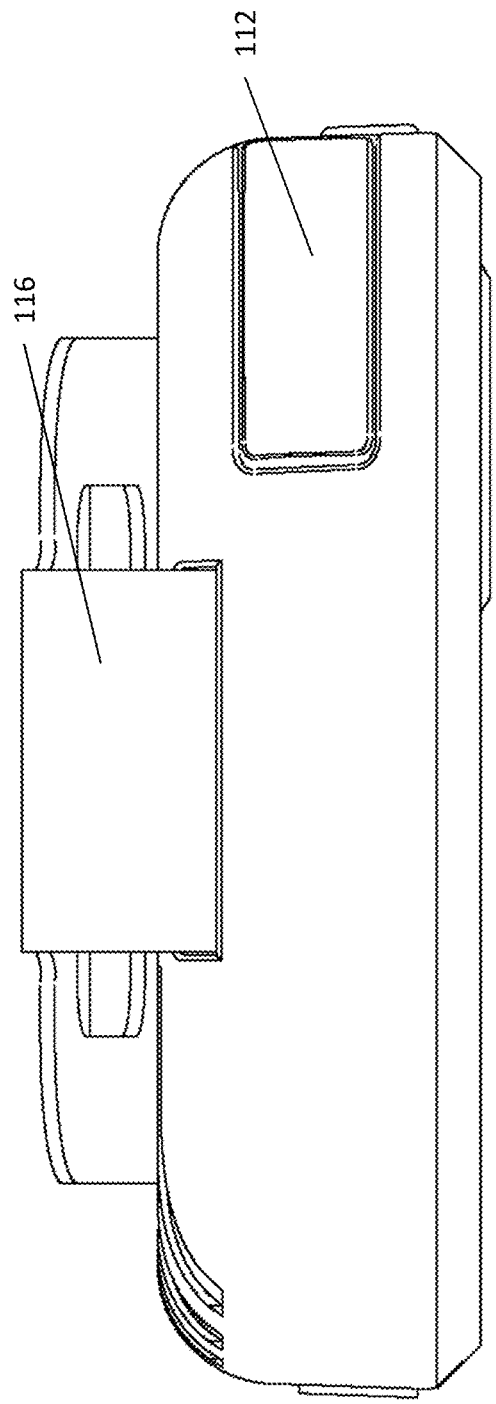
Figure 2:
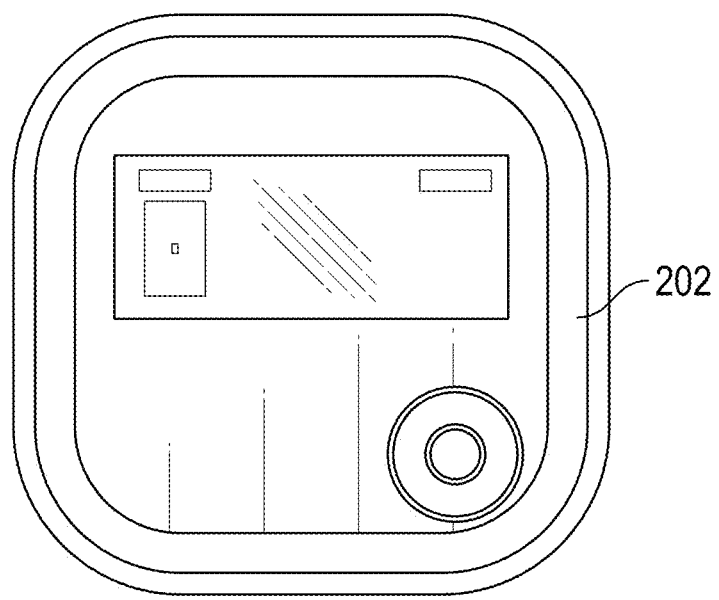
FIG. 2 illustrates one embodiment of a cover configured to be used in conjunction with one embodiment of the golf GPS device.

FIGS. 1E-1F illustrate the circumferential surfaces of one embodiment of the golf GPS device. In the depicted embodiment, the circumferential surfaces include a plurality of buttons for user input and a data port. Other embodiments may or may not comprise one or more buttons for user input and/or a data port. In certain embodiments, the one or more buttons for user input and/or data port can all be located on one of the circumferential surfaces. In other embodiments, the one or more buttons for user input and/or data port can be located on a plurality of circumferential surfaces.

Power Button

In an embodiment, the golf GPS device comprises a power button. In the depicted embodiment, a power button 106 is located on a circumferential surface of the device and is configured to turn the device on or off. In other embodiments, the power button can be located on the front surface, back surface, or any other circumferential surface. In certain embodiments, the golf GPS device does not comprise a separate power button.

Position Mark Button

In an embodiment, the golf GPS device comprises a position mark button. In the depicted embodiment, a position mark button 108 is located on a circumferential surface of the device.

In some embodiments, when a user presses the position mark button 108, the device visually displays a position mark view which indicates that the current position (first location) of the device is stored. The user can subsequently press the position mark button 108 while at a second location, which triggers the device to calculate the distance between the first location and the second location using the GPS module. For example, the user can press the position mark button 108 before and after swinging at a ball to determine the user's range.

In certain embodiments, when a user presses and holds the position mark button 108 for longer than a particular period of time, the device displays the current time. The particular period of time can be, for example, about 1 second, about 2 seconds, about 3 seconds, about 4 seconds, about 5 seconds, or any other time period.

Volume Control

In an embodiment, the golf GPS device comprises a volume control for controlling the volume of the audio speaker(s). In the depicted embodiment, a volume control 110 is located on a circumferential surface of the device.

In some embodiments, the volume control can trigger additional functions other than controlling the volume. For example, in certain embodiments, when a user presses and holds the plus volume button for longer than a particular period of time, the device switches between yards and meters as the unit of distance measurement. Further, in certain embodiments, when a user presses and holds the minus volume button for longer than a particular period of time, the golf GPS device switches between alternate greens on the golf course. In other words, the device switches between determining distances from the device to points on alternate greens of the same golf course. The particular period of time can be, for example, about 1 second, about 2 seconds, about 3 seconds, about 4 seconds, about 5 seconds, or any other time period.

Data Port

In an embodiment, the golf GPS device includes one or more ports to connect the golf GPS device to a computer. Such ports can be USB, mini USB, micro USB, firewire, or any other ports to be developed. The data port can be located on the front surface, back surface, or circumferential surface of the device. In the depicted embodiment, a data port 112 is located on the corner of two circumferential surfaces. The data port can be configured such that a data cable of the sort described above can be plugged into the device. For example, in the depicted embodiment, a micro USB 5 pin data cable can be used to connect the golf GPS device to a computer. In some embodiments, a user can connect the golf GPS device to a computer using one of such ports to download software updates, update golf course maps, or additional golf course maps. In another embodiment, the golf GPS device includes a wireless port, which enables the golf GPS device to wirelessly connect to a computer.

Device Cover

In an embodiment, the golf GPS device can be covered with a cover or a case 202. This cover can be substantially waterproof or water resistant to protect the golf GPS device from coming into contact with water. In one embodiment, the case 202 is made of silicon. In some embodiments, the cover covers the whole front surface where the display is located while leaving a substantial portion of the back side uncovered so the functionality of the speaker(s) located on the back surface is not hindered. In other embodiments, the cover can have holes or vents configured to be placed over the speaker(s) as to not substantially hinder the functionality of the speaker(s), regardless of whether the speaker(s) is located on the front surface, back surface, or circumferential surfaces.

Hole Recognition

In an embodiment, the golf GPS device automatically identifies the particular hole of a particular golf course where the device is located. In some embodiments, for example, the GPS module of the golf GPS device uses one or more GPS satellites to determine the location of the device. In certain embodiments, the golf GPS device can use the determined location and the plurality of golf course maps stored in the memory of the device to further identify which golf course and/or which hole thereof the device is currently located.

General Hole Information

In an embodiment, once the golf GPS device has identified the particular hole of a particular golf course where the device is currently located, the device further conveys information about the particular hole to the user. In some embodiments, the device can be configured to automatically convey such information when it identifies the particular hole of a particular golf course where the device is currently located. In other embodiments, the device can be configured to convey such information when it receives a particular input from the user. For example, in some embodiments, the golf GPS device can display or verbally report using the speakers the total distance from the tee box to the center of the green or the hole cup. In some embodiments, the golf GPS device displays or verbally reports the hole number and/or par number of that hole. All or a portion of such information can be stored in the device's memory.

Shot Distance

In an embodiment, the golf GPS device can be configured to determine the shot distance of the user's swing. For example, in some embodiments, a user can press a button or otherwise instruct the golf GPS device to store a current position of the golf GPS device. Upon receiving such input, the golf GPS device can utilize its GPS module to determine the current location of the device.

In certain embodiments, such feature of the golf GPS device can be utilized to measure the shot distance of a user. For example, in some embodiments, a user can select a unique input before swinging. Upon receiving this input, the golf GPS device utilizes the GPS module to determine the location of the device before swinging (first location). After swinging, the user can relocate to the subsequent location of the ball and select the unique input again. Upon receiving the input, the golf GPS device again utilizes the GPS module to determine the location of the device, now after swinging (second location). In certain embodiments, the golf GPS device can determine the shot distance by determining the distance between the first location and the second location based on their coordinates identified by the GPS module. The shot distance can be visually displayed or audibly reported to the user.

Current Location and Related Information

In an embodiment, the golf GPS device is configured to determine the current location of the device using the GPS module and further convey related information to the user. For example, in some embodiments, the golf GPS device displays or verbally reports distances between the current location of the device to the front, back, and/or center of the green. To determine such distances, the golf GPS device, in certain embodiments, utilizes its GPS module to determine the device's current location and further utilizes its database of golf course maps stored in its memory. In some embodiments, the golf GPS device comprises a button or other input that a user can select to trigger the device to determine and convey such distances to the user via its display and/or speaker(s).

Hole Selection

In an embodiment, the golf GPS device comprises a button and/or other input that allows the user to manually select a particular hole the golf GPS device is to track. For example, in some embodiments, upon pressing the button and/or other input, the device displays and toggles through hole numbers. The user can stop and select a desired hole when it is displayed on the display. In certain embodiments, the input is a combination of more than one button. For example, in certain embodiments, a user can press the main button 104 and the plus volume control 110 to bring up a hole selection screen that displays a particular hole number. Then, the user can use the volume control 110 to toggle through different hole numbers in sequential order and select a desired hole.

Distance Unit

In an embodiment, the golf GPS device comprises a button and/or other input that allows the user to select a unit of distance to be used by the device when conveying information to the user. For example, in some embodiments, the distance unit can include but is not limited to meters and yards. In certain embodiments, the input is a combination of more than one button.

Audio and/or Display Mode Selection

In an embodiment, the golf GPS device is configured to report information related to tracking data, as discussed above, to the user via audio only, video only, or both. Depending on the situation, the user/player may only want to audibly hear such reports, only view such reports on the display, or both. For example, when a user/player has attached the golf GPS device to an article of clothing, such as a hat or belt, then the user/player may not visually see the information displayed on the device. In such situations, the user/player would rather have the golf GPS device only report the information via audio and have the display screen turned off to save battery life associated with displaying the information on the display screen. However, when a user/player is holding the device in his or her hands to view information on the display, the user/player would want the display screen to be on. In such situations, the user/player may also want the audio function to be on or off.

Audio and/or Display Mode Selection—Manual Input

In an embodiment, the golf GPS device includes an input that the user/player can select to instruct the device to switch between audio-only, display-only, and audio-display modes. In some embodiments, the input is a single button. The single button can be located on the front surface, the back surface, or any of the circumferential surfaces. In other embodiments, the input is a combination of more than one button that a user has to press at once or according to some unique pattern. Further, in certain embodiments, the input is a touch pattern, motion, or any predefined touch input on a touchscreen input located on the golf GPS device.

Audio and/or Display Mode Selection—Automatic Input

In an embodiment, the golf GPS device is configured to automatically determine if the golf GPS device is clipped and turn the display screen on or off depending on the determination. For example, if the golf GPS device determines that the device is clipped, the device can be configured to automatically turn off the display screen. If the golf GPS device determines that the device is not clipped, the device can be configured to automatically turn on the display screen. Further, in some embodiments, the audio mode is automatically turned on when the golf GPS device is clipped. The audio mode is automatically turned off in certain embodiments when the golf GPS device is not clipped. In other embodiments, the audio function remains turned on until a user/player manually turns it off.

Sensors

In embodiments, the one or more processors determine the clip mode without any user input to the golf GPS device. For this, the device further includes one or more sensors configured to monitor at least one physical property in either or both of the spring plate and the rear surface and to provide information indicative of the monitored physical property to the one or more processors. The at least one physical property is selected from the group consisting of capacitance, resistance, piezoelectricity, electric current, electric potential, magnetism, pressure, tension, and deflection.

In embodiments, the one or more sensors include a first electrode in the clip and a second electrode on the rear surface or inside the body. The one or more processors are configured to determine the clip mode when detecting that at least one property in either or both of the spring plate and the rear surface reaches and exceeds a predetermined value with the grip of the portion of the object. The one or more processors are configured to determine a non-clip mode when detecting that at least one property in either or both of the spring plate and the rear surface falls behind the same or another predetermined value or lower with the grip of the portion of the object.

In one embodiment, when no object is gripped between the spring plate and the rear surface, the first and second electrodes are in contact with each other. Upon gripping the object between the spring plate and the rear surface, the one or more sensors monitor property indicative of disconnecting of the first and second electrodes.

In another embodiment, when no object is gripped between the spring plate and the rear surface, the first and second electrodes are apart from each other at a gap therebetween. Upon gripping the object between the spring plate and the rear surface, the one or more sensors monitor property indicative of increase of the gap.

In embodiments, the one or more sensors monitor deflection of a portion of the clip, wherein the one or more processors are configured to determine the clip mode when detecting that the deflection reaches and exceeds a predetermined value. The one or more processors are configured to determine a non-clip mode when detecting that the deflection falls behind the same or another predetermined value.

Audio and/or Display Mode Selection—Sensors for Automatic Input

In an embodiment, the golf GPS device or portions thereof can include one or more sensors that are configured to determine whether the device is clipped or not. In some embodiments, the sensor(s) is configured to determine whether there is physical contact between the sensor(s) and another surface. In other embodiments, the sensor(s) is configured to determine whether the clip is widened or not. In some embodiments, the sensor is an electrical sensor that comprises one or more electrodes. In certain embodiments, the sensor can detect capacitance, resistance, piezoelectricity, current, electric potential, changes thereof, and/or any other electrical variable. In other embodiments, the sensor is a mechanical sensor that can detect tension, pressure, changes thereof, and/or any other mechanical variable. One skilled in the art would understand alternative techniques that are available for the general purposes described herein.

Audio and/or Display Mode Selection—Sensor on Back Surface

In some embodiments, a sensor or its electrode is located on the back surface of the golf GPS device or a portion thereof. For example, in certain embodiments, a sensor or its electrode is located on the back surface of the device that is covered by the clip. Generally, this portion of the back surface does not come into contact with another surface unless the device is clipped. In some embodiments, once the sensor(s) detects that there is physical contact with another surface, this information is sent to the processor which further transmits instructions to turn the display mode off and/or turn the audio mode on. Conversely, in some embodiments, when the sensor(s) detects that there is no physical contact with another surface, this information is sent to the processor which further transmits instructions to turn the display mode on and/or turn the audio mode off.

Audio and/or Display Mode Selection—Sensor on Outside Surface of Clip

In certain embodiments, a sensor or its electrode is located on the outside surface of the clip that faces the opposite direction as the front surface of the golf GPS device. Generally, when the golf GPS device is clipped, the outside surface of the clip is not in contact with another surface. However, when a player holds the golf GPS device in his or her hands to view the display, the outside surface of the clip comes into contact with another surface. In some embodiments, once the sensor(s) detects that there is physical contact with another surface, this information is sent to the processor which further transmits instructions to turn the display mode on and/or turn the audio mode off. Conversely, in some embodiments, when the sensor(s) detects that there is no physical contact with another surface, this information is sent to the processor which further transmits instructions to turn the display mode off and/or turn the audio mode on.

Audio and/or Display Mode Selection—Sensor on Circumferential Surface

In some embodiments, a sensor or its electrode is located on the circumferential surface of the golf GPS device or a portion thereof. Generally, the circumferential surface does not come into contact with another surface while the device is clipped. However, when a player holds the golf GPS device in his or her hands to view the display, the circumferential surface comes into contact with another surface. In some embodiments, once the sensor(s) detects that there is physical contact with another surface, this information is sent to the processor which further transmits instructions to turn the display mode on and/or turn the audio mode off. Conversely, in some embodiments, when the sensor(s) detects that there is no physical contact with another surface, this information is sent to the processor which further transmits instructions to turn the display mode off and/or turn the audio mode on.

Audio and/or Display Mode Selection—Sensor on Hinge of Clip

In some embodiments, a sensor or its electrode is located on the hinge of a clip and is configured to determine whether the clip is widened or not. In some embodiments, once the sensor(s) detects that the clip is widened, this information is sent to the processor which further transmits instructions to turn the display mode off and/or turn the audio mode on. Conversely, in some embodiments, when the sensor(s) detects that the clip is not widened, this information is sent to the processor which further transmits instructions to turn the display mode on and/or turn the audio mode off.

Audio and/or Display Mode Selection—Examples

In some embodiments, an electric potential sensor or its electrode is located on the back surface of the device and/or a portion of the clip that contacts the back surface when the device is not clipped. The electric potential sensor can be configured to detect the electric potential on the back surface of the device and the portion of the clip that contacts the back surface when the device is not clipped. In some embodiments, if the electric potential values detected from both surfaces are the same, then the golf GPS device determines that the device is not clipped. In other embodiments, if the electric potential values detected from both surfaces are different, then the golf GPS device determines that the device is clipped.

In certain embodiments, a capacitance sensor or its electrode is located on the back surface. The capacitance sensor can be configured to detect the capacitance between the back surface of the device and another surface in contact with the back surface. In some embodiments, the golf GPS device is configured to compare the detected capacitance values with one or more pre-stored values or other detected values and determine whether the device is clipped or not based on such determination.

Other Sensors

In embodiments, the device includes a gyroscope. The one or more processors detect the orientation of the device based on information from the gyroscope. The one or more processors further determine that the device is clipped with a golfer's headwear, in which a portion of the headwear is gripped between the spring plate and the rear surface. Upon determining that the device is clipped with a portion of the golfer's headwear, the one or more processors cause the user interface to operate in the clip mode, in which the determined distance displayed on the display screen is turned off. In embodiments, the one or more processors determine that the device is clipped with a golfer's headwear, when the front surface is generally facing away from the ground or the rear surface is generally facing the ground for a predetermined period of time.

In some embodiments, the one or more processors further determine that the device is clipped with a golfer's waist belt, in which a portion of the golfer's waist belt is gripped between the spring plate and the rear surface. Upon determining that the device is clipped with a portion of the golfer's waist belt, the one or more processors cause the user interface to operate in the clip mode, in which the orientation of the determined distance displayed on the display screen is changed to the second orientation. The one or more processors determine that the device is clipped with a golfer's waist belt, when the front and rear surfaces is facing generally in a horizontal direction for a predetermined period of time.

In embodiments, the device includes one or more temperature sensors. The one or more processors determine that the device is clipped with a golfer's waist belt, when a temperature detected on the side of rear surface is substantially higher than a temperature detected on the side of front surface.

Determination of Playing Hole Based on Map Information

Figure 10:
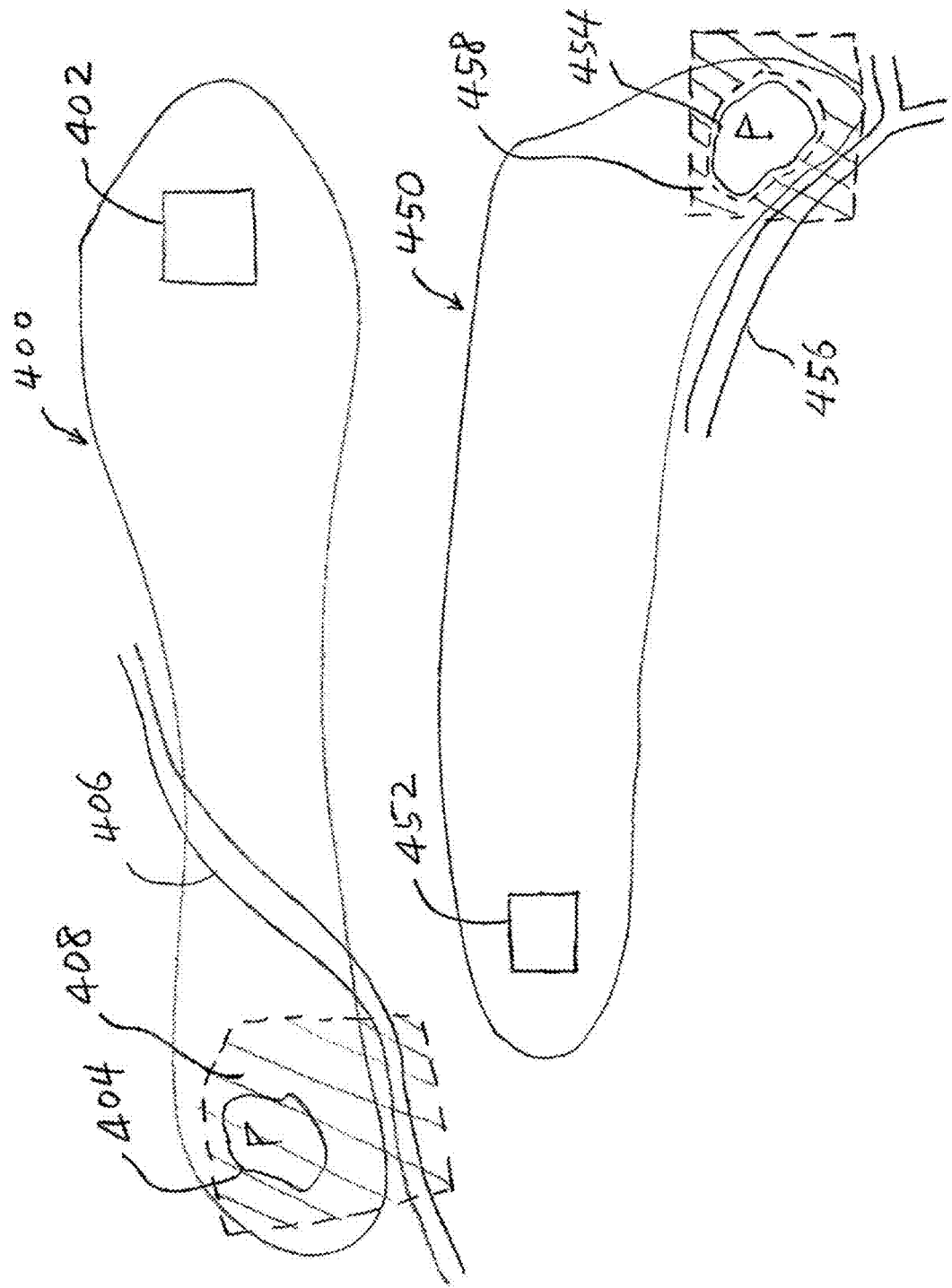
FIG. 10 illustrates a map of holes of a golf course, the data of the map being stored in a golf GPS device in accordance with an embodiment.

In embodiments, the map information includes geographical or locational information of features of golf holes. Referring to FIG. 10, holes 400 and 450 comprises a greens 404 and 454 and a tee-off areas 402 and 452. Map information of each hole comprises locational information of the green 404 or 454 and locational information of the tee-off area 402 or 452 and the hole number pre-assigned to that hole. The feature of the first hole 400 comprises a position of or associated with the green 404 of the first hole 402, wherein the position of or associated with the green 404 is predetermined and included in the map information of the first hole 400 or chosen by a predetermined algorithm at the time of computing the first distance.

In embodiments, each hole map information comprises a predetermined area defined with a boundary line or boundary lines on a map of that hole 400 or 450. The boundary line or lines of the predetermined area does not accurately follow the boundary of the hole as published by the golf course. The predetermined area is used for determining whether the device is located within the hole such that when the device is located within the predetermined area of the second hole, then the processor determine that the device is located in the second hole 450.

In embodiments, the predetermined area of each hole does not encompass a portion of the hole. The processor may determine that the device remains located in the first hole 400 once the device is within the predetermined area of the first hole 400 and leaves the predetermined area of the first hole 400 as long as the device does not enter the predetermined area of another hole, for example hole 450.

In embodiments, the processor may determine that the device has moved from the first hole 400 to the second hole 450, when the device travels from a location within the predetermined area of the first hole to outside the predetermined area of the first hole, and then enters the predetermined area of the second hole.

Unintended Playing Hole Change

In some situations, a player, while playing on hole X (400 in FIG. 10), accidently hits the ball to the course of hole Y (450 in FIG. 10) before completing playing on hole X. In certain situations, hole Y is the subsequent hole after hole X. However in other situations, hole Y is simply a neighboring hole or a hole that is close to hole X and not the subsequent hole. In some embodiments, once the player moves to the location of the ball on hole Y, the golf GPS device will automatically recognize that the device is now located on the course of hole Y. The golf GPS device will further begin to determine distances between the device's current location on hole Y and various features along hole Y, such as those discussed above. However, because the player has not yet completed hole X, the player would rather want to know distances between the player (or the device) and various features of hole X.

In an embodiment, the player-user can manually select hole X on the device as to instruct the device to determine and report distances from the device to various features of hole X. However, this can be time consuming and/or inconvenient depending on the manual selection system, especially if the user has to scroll through a list of a plurality of holes to select hole X.

User Selection of Playing Hole

Figure 8:
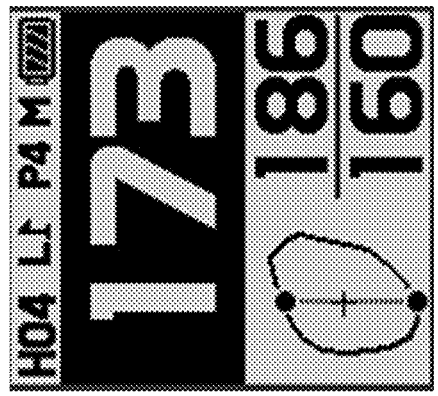
FIG. 8 illustrates a display screen of a golf GPS device in accordance with an embodiment.
Figure 9:
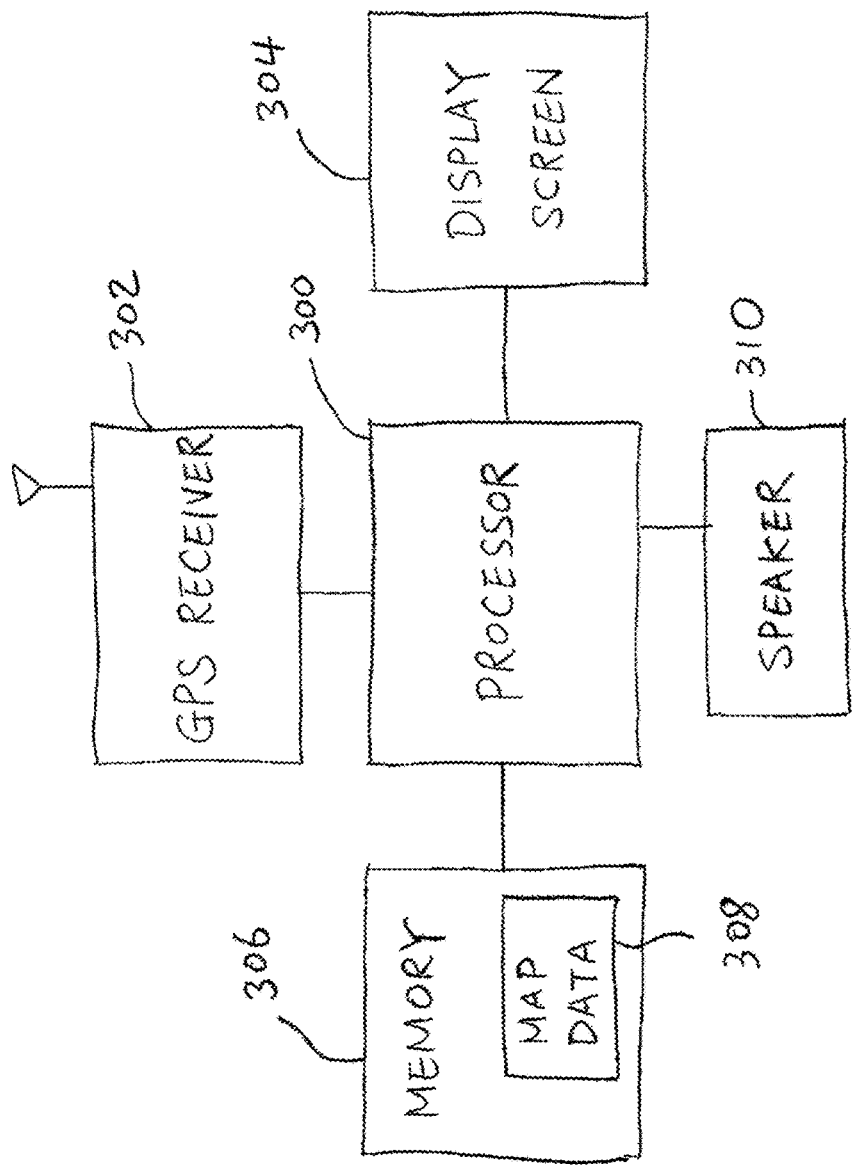
FIG. 9 illustrates a block diagram of a golf GPS device in accordance with an embodiment.

Referring to FIGS. 9 and 10, in embodiments, in order to allow a user to select hole X on the device, the processor 300 of the golf GPS device is configured to repeatedly determine in which one of the plurality of holes the device is located, and to determine if the device has moved from a first one 400 of the plurality of holes to a second one 450 of the plurality of holes. Once determined that the device has moved from the first hole 400 to the second hole 450, the processor determines whether or not the second hole is immediately subsequent to the first hole in terms of the pre-assigned hole numbers of the first and second holes in the golf course. When determined that the second hole 450 is not immediately subsequent to the first hole 400 in terms of the pre-assigned hole numbers of the first and second holes in the golf course, the processor causes to display for selection by a user the hole numbers of the first and second holes on the display screen as shown in FIG. 7. Upon the user's selection of the hole number of the first hole 400, the processor computes a distance between the device and a feature 404 of the first hole 400 and causes to display the computed distance on the display screen and the hole number of the first hole 400 as illustrated in FIG. 8.

When the user select the second hole 450, the processor computes a distance between the device and a feature 454 of the second hole 450 and causes to display the computed distance on the display screen and the hole number of the second hole 450.

Automatic Change to Next Hole

With continuous reference to FIGS. 9 and 10, when determined that the second hole 450 is immediately subsequent to the first hole, the processor determines if the device has stayed within a predetermined zone 408 of the first hole 400 before moving to the second hole 450. When determined that the device has not stayed within the predetermined zone 408, the processor computes the first distance between the device and the feature, for example, the green 404 of the first hole 400 and causes to display the computed first distance on the display screen.

For this, the map information of the holes 400 and 450 include the predetermined zones 408 and 458, which comprise an arbitrarily defined area on a map of the corresponding hole. The areas encompass one or more features of hole, for example, at least part of the green 404, a golf cart paths 406 and 456 next to the greens 404, 454, an area adjacent the green 404, and an area surrounding the green 404. The zone 408 includes the green 404. Alternatively, the zone 458 exclude the green 454 while surrounding the green 454. In embodiments, the predetermined zones 408 and 458 do not include tee-off areas 402 and 452.

In embodiments, when determined that the second hole is immediately subsequent to the first hole 400, the processor determines if the device has stayed within a predetermined zone 404 of the first hole for a predetermined period or longer before moving to the second hole 450. When determined that the device has stayed within the predetermined zone 404 for the predetermined period or longer, only then the processor computes a distance between the device and a feature 454 of the second hole 450 and causes to display the computed distance on the display screen.

Hot Key Function

In some embodiments, the golf GPS device includes a hot key or some other unique input that the user can select or otherwise input to accelerate this process. Upon receiving input to trigger the hot key feature, the golf GPS device can automatically identify the immediately previous hole where the device was located without having to go through other holes intervening between holes X and Y in order. The golf GPS device can further determine and convey to the user information related to features of the immediately previous hole, such as but not limited to distances between the device's current location to various features of the immediately previous hole.

In certain embodiments, upon receiving such unique input, the golf GPS device determines whether the immediately previous hole was completed or not. In order to do so, in some embodiments, the device can determine one or more of whether the device was within a certain distance of the hole cup of the immediately previous hole and whether the device was ever located on the green of the immediately previous hole. If the device determines that it was, then in certain embodiments, the device confirms that the player accidently moved to another hole before completing the previous hole.

This hot key function is not limited to golf GPS devices of any particular type. Rather, the hot key function may be incorporated into any type of golf GPS device. For example, any of the golf GPS devices illustrated in FIG. 5B 502, 504, 506, 508 can comprise the hot key function described herein.

Hot Key Input

In an embodiment, the hot key is a single button that is located on the front surface, the back surface, or the circumferential surfaces. In another embodiment, the hot key is a plurality of buttons that a user has to press or otherwise select. Such plurality of buttons can be located on the front surface, the back surface, or the circumferential surfaces. In certain embodiments, individual buttons of the plurality of buttons can be located on different surfaces among the front surface, the back surface, and the circumferential surfaces. For example, in an embodiment, a user can press the main button 104 and the position mark button 108 together at the same time to trigger the hot key function.

Further, in an embodiment, the hot key is not a physical button but is a unique pressing pattern on a touchscreen input located on the golf GPS device. In some embodiments, the display itself is a touchscreen upon which a user can input the unique pressing pattern to trigger the hot key. In certain embodiments, the unique pressing pattern can be a unique sliding motion, a unique tapping motion, or a unique combination of any touch screen input.

No Hot Key Input

In an embodiment, the golf GPS device does not comprise a hot key but is configured to automatically perform the hot key function under particular circumstances. For example, in some embodiments, when the golf GPS device detects that the location of the device has moved from a point on hole X to hole Y, the golf GPS device is configured to determine whether hole Y is the immediately subsequent hole in order. In some embodiments, if hole Y is not the immediately subsequent hole in order, then the hot key function is automatically triggered. In certain embodiments, if hole Y is the immediately subsequent hole in order, then the hot key function is not triggered.

In certain embodiments, when the golf GPS device detects that the location of the device has moved from a point on hole X to hole Y, the golf GPS device is configured to determine whether hole X was completed by one or more methods described above. In some embodiments, if the golf GPS device determines that hole X was not completed, then the hot key function is automatically triggered. In certain embodiments, if the golf GPS device determines that hole X was completed, then the hot key function is not triggered.

In some embodiments, the hot key function is automatically triggered when the golf GPS device determines that hole Y is not the immediately subsequent hole to hole X in order and that hole X was not completed. In other embodiments, the hot key function is automatically triggered when the golf GPS device determines that hole Y is not the immediately subsequent hole to hole X in order or that hole X was not completed.

Dynamic Green View

In an embodiment, the golf GPS device displays a view of the green of the hole where the device is currently located. In general, depending on the location of the player relative to the green, the view of the green as seen from the player's point of view will be different. In some embodiments, the golf GPS device automatically determines the direction from which the player will be approaching the green and tilts the display of the green accordingly on the display. In other words, the golf GPS device displays the view of the green as seen from the player's location.

Although the embodiments of the inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above.

What is claimed is:

1. A portable information processing and viewing device for use in a golf course comprising a plurality of holes, the device comprising:
  a GPS receiver configured to receive GPS information;
  one or more memory devices configured to store data;
  map data stored in the one or more memory devices, the map data comprising map information of each one of the plurality of holes;
  a display screen configured to display information; and
  one or more processors configured to:
    determine that the device has moved from a first hole of the plurality of holes to a second hole of the plurality of the holes;
    in response to determining that the device has moved from the first hole to the second hole, determine that the second hole is immediately subsequent to the first hole;
    in response to determining that the second hole is immediately subsequent to the first hole, determine that the device did not spend a threshold amount of time in a predetermined zone associated with the first hole prior to moving to the second hole; and
    in response to determining that the device did not spend the threshold amount of time in the predetermined zone prior to moving to the second hole, continue to cause the display screen to display information associated with the first hole instead of displaying information associated with the second hole in which the device is located.

2. The device of claim 1, wherein the one or more processors are further configured to determine that the device did not spend the threshold amount of time in the predetermined zone associated with the first hole based on determining that the device did not spend any time in the predetermined zone.

3. The device of claim 1, wherein the information associated with the first hole comprises a distance between the device and a hole feature in the first hole.

4. The device of claim 1, wherein the information associated with the first hole comprises a distance between the device and a portion of a green of the first hole.

5. The device of claim 1, wherein the predetermined zone associated with the first hole includes a green of the first hole.

6. The device of claim 5, wherein the predetermined zone associated with the first hole includes a region outside the green of the first hole.

7. The device of claim 5, wherein the predetermined zone associated with the first hole includes a cart path near the green of the first hole.

8. The device of claim 1, wherein the predetermined zone associated with the first hole excludes a tee-off area of the second hole.

9. The device of claim 1, wherein the predetermined zone associated with the first hole excludes a tee-off area of the first hole.

10. The device of claim 1, wherein the first hole is associated with a first hole number and the second hole is associated with a second hole number, wherein the one or more processors are configured to determine that the second hole is immediately subsequent to the first hole based on the second hole number being greater than the first hole number by 1.

11. The device of claim 1, wherein the one or more processors are further configured to:
cause the display screen to display a request for user input indicating whether the information associated with the first hole should continue to be displayed via the display screen; and
in response to receiving user input indicating that the information associated with the first hole should continue to be displayed via the display screen, continue to cause the display screen to display information associated with the first hole.

12. A method of operating a portable information processing and viewing device in a golf course comprising a plurality of holes, the method comprising:
providing the device of claim 1;
receiving GPS information via the GPS receiver;
determining a location of the device using the GPS information;
determining that the device has moved from a first hole of the plurality of holes to a second hole of the plurality of the holes;
in response to determining that the device has moved from the first hole to the second hole, determining that the second hole is immediately subsequent to the first hole;
in response to determining that the second hole is immediately subsequent to the first hole, determining that the device did not spend a threshold amount of time in a predetermined zone associated with the first hole prior to moving to the second hole; and
in response to determining that the device did not spend the threshold amount of time in the predetermined zone prior to moving to the second hole, continuing to display information associated with the first hole instead of displaying information associated with the second hole in which the device is located.

13. The method of claim 12, further comprising:
computing a distance between the device and a predetermined feature of the first hole; and
displaying the distance on a display screen of the device.

14. The method of claim 12, further comprising determining that the device did not spend the threshold amount of time in the predetermined zone associated with the first hole based on determining that the device did not spend any time in the predetermined zone.

15. The method of claim 12, wherein the information associated with the first hole comprises a distance between the device and a hole feature in the first hole.

16. The method of claim 12, wherein the information associated with the first hole comprises a distance between the device and a portion of a green of the first hole.

17. The method of claim 12, wherein the predetermined zone associated with the first hole includes a green of the first hole.

18. The method of claim 12, wherein the predetermined zone associated with the first hole excludes a tee-off area of the second hole.

19. The method of claim 12, wherein the predetermined zone associated with the first hole excludes a tee-off area of the first hole.

20. The method of claim 12, further comprising:
computing a distance between the device and a green of the first hole while the device is located in the second hole; and
displaying the distance on a display screen of the device.

* * * * *